United States Patent [19]

Yoda

[11] Patent Number: 5,682,503
[45] Date of Patent: Oct. 28, 1997

[54] SELF-ORGANIZING NEURAL NETWORK FOR PATTERN CLASSIFICATION

[75] Inventor: Fumio Yoda, Hillsboro, Oreg.

[73] Assignee: Mitsubishi Denki Kabushiki Kaisha, Tokyo, Japan

[21] Appl. No.: 320,715

[22] Filed: Oct. 11, 1994

Related U.S. Application Data

[62] Division of Ser. No. 654,800, Feb. 12, 1991, abandoned.

[51] Int. Cl.⁶ .................................................. G06F 15/18
[52] U.S. Cl. .............................. 395/24; 395/22; 395/23
[58] Field of Search ................................ 395/24, 23, 22

[56] References Cited

U.S. PATENT DOCUMENTS

| | | | |
|---|---|---|---|
| 3,950,733 | 4/1976 | Cooper et al. | 340/172.5 |
| 4,044,243 | 8/1977 | Cooper et al. | 235/152 |
| 4,326,259 | 4/1982 | Cooper et al. | 364/715 |
| 4,451,929 | 5/1984 | Yoshida | 382/15 |
| 4,760,604 | 7/1988 | Cooper et al. | 382/15 |
| 4,774,677 | 9/1988 | Buckley | 364/513 |
| 4,805,225 | 2/1989 | Clark | 382/15 |
| 4,914,708 | 4/1990 | Carpenter et al. | 395/21 |
| 4,958,375 | 9/1990 | Reilly et al. | 382/14 |
| 4,975,961 | 12/1990 | Sakoe | 395/22 |
| 5,033,006 | 7/1991 | Ishizula et al. | 395/23 |
| 5,045,713 | 9/1991 | Shima | 395/24 |
| 5,048,100 | 9/1991 | Kuperstein | 395/24 |
| 5,052,043 | 9/1991 | Goborski | 395/32 |
| 5,056,037 | 10/1991 | Eberhardt | 395/23 |
| 5,060,278 | 10/1991 | Fukumizu | 382/14 |
| 5,129,039 | 7/1992 | Hiraiwa | 395/24 |
| 5,157,738 | 10/1992 | Carpenter et al. | 395/23 |
| 5,165,010 | 11/1992 | Masuda et al. | 395/27 |
| 5,195,169 | 3/1993 | Kamiya et al. | 395/23 |
| 5,214,743 | 5/1993 | Asai et al. | 395/11 |
| 5,293,454 | 3/1994 | Kamiya | 395/23 |
| 5,297,237 | 3/1994 | Masuoka et al. | 395/23 |
| 5,299,284 | 3/1994 | Roy | 395/23 |
| 5,553,196 | 9/1996 | Takatori et al. | 395/23 |

OTHER PUBLICATIONS

Dan Hammerstrom, "A VLSI Architecture for High-Performance, Low-Cost, On-Chip Learning", IEEE IJCNN, Jun. 1990.

T. Kohonen, "Statistical Pattern Recognition Revisited", Advanced Neural Computers, R. Eckmiller, ed (1990), 137–143.

T. Kohonen, "Improved Versions of Learning Vector Quantization", Proc. of Int'l. Joint Conf. of Neural Networks, Jun. 1990, (I–545)–(I–550).

(List continued on next page.)

*Primary Examiner*—George B. Davis
*Attorney, Agent, or Firm*—Wolf, Greenfield & Sacks, P.C.

[57] ABSTRACT

A neural network includes a plurality of input nodes for receiving the respective elements of the input vector. A copy of all of the elements of the input vector is sent to the next level of nodes in the neural network denoted as intermediate nodes. The intermediate nodes each encode a separate template pattern. They compare the actual input pattern with the template and generate a signal indicative of the difference between the input pattern and the template pattern. Each of the templates encoded in the intermediate nodes has a class associated with it. The difference calculated by the intermediate nodes is passed to an output node for each of the intermediate nodes at a given class. The output node then selects the minimum difference amongst the values sent from the intermediate nodes. This lowest difference for the class represented by the output node is then forwarded to a selector. The selector receives such values from each of the output nodes of all of the classes and then selects that to output value which is a minimum difference. The selector in turn, generates a signal indicative of the class of the intermediate node that sent the smallest difference value.

63 Claims, 16 Drawing Sheets

Microfiche Appendix Included
(1 Microfiche, 13 Pages)

OTHER PUBLICATIONS

B.G. Batchelor, "Classification and Data Analysis in Vector Spaces," Pattern Recognition; Ideas in Practice, ed (1977), pp. 67–116.

Reilly et al., Learning System Architectures Composed of Multiple Learning Modules, Brown University, Providence, RI, (1987).

Makhoul, et al., Vector Quantization in Speech Coding, Proceedings of the IEEE, vol. 73, No. 11, pp. 1551–1588, Nov. 1985.

J. Marshall, "Self–Organizing Neural Networks for Perception of Visual Motion", Neural Networks, vol. 3, No. 1, 1990, pp. 45–74.

Fritz Seytter, "A Self–Organizing Neural Net for Depth Movement Analysis", Parallel Processing in Neural Systems and Computers, Elsevier Sci. Pub. 1990, pp. 369–372.

Sebestyen, "Decision–Making Processes in Pattern Recognition," MacMillan, 1962, pp. 17–24, 37–53, 91–96, 108–112, 120–131 and 142–151.

R. Duda et al., Pattern Classification and Scene Analysis, 1973, pp. 1–7.

C. Suen et al., "Automated Recognition of Handprinted Characters–The State of the Art", Proc. of IEEE, Apr. 1980, pp. 469–487.

R. Lippman, "An Introduction to Computing with Neural Nets", IEEE ASSP Magazine, Apr. 1987, pp. 4–22.

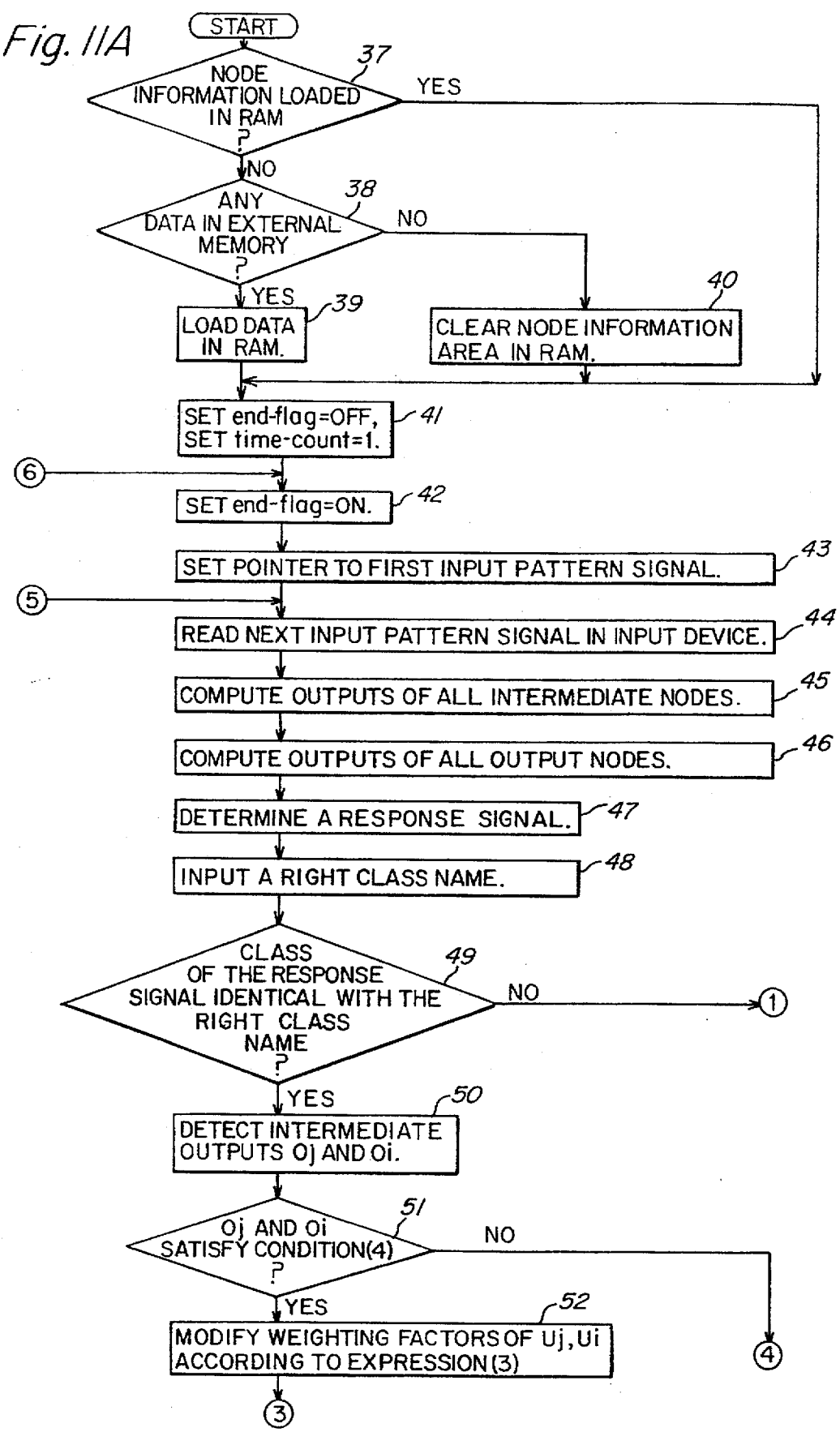

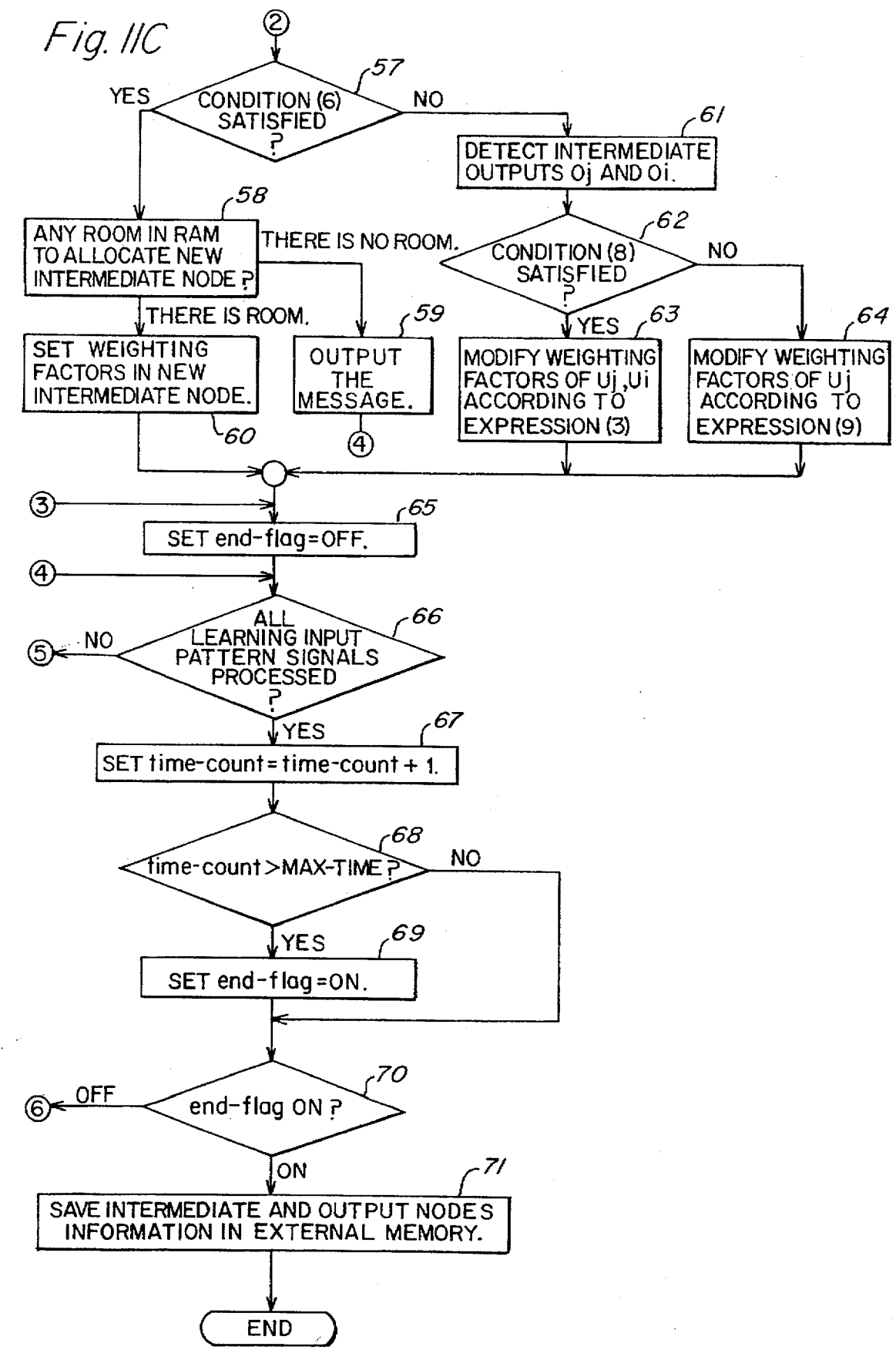

SELF-ORGANIZING NEURAL NETWORK FOR PATTERN CLASSIFICATION

This application is a division of application Ser. No. 7/654,800 filed Feb. 12, 1991, now abandoned.

A portion of the disclosure of this patent document contains material which is subject to copyright protection. The copyright owner has no objection to the facsimile reproduction by any one of the patent disclosure, as it appears in the Patent and Trademark Office patent rules or records, but otherwise, reserves all rights whatsoever.

MICROFICHE APPENDIX

The present patent application contains a microfiche appendix having 13 frames on 1 sheet.

BACKGROUND OF THE INVENTION

1. Field of the Invention

The present invention relates generally to pattern classification systems and, more particularly, to a self-organizing neural network for pattern classification, which is able to vary a response signal by learning to separate and to identify a correct class of the input signal from repeated presentations of an input pattern signal.

2. Description of the Prior Art

Recognition devices, such as character, voice, or target recognition devices, separate input pattern signals into classes. Such recognition devices rely on pattern recognition techniques, such as template matching or structure analytic techniques, which require manual development and input of the information necessary for classifying input pattern signals. These techniques also require manual adjustment for properly separating classes. Such manual intervention decreases the efficiency of the system and creates the possibility of human error being injected into the system.

In order to eliminate the necessity of manual development and input of the requisite information, a pattern classifying technique has been developed which is able to organize itself to classify input pattern signals of a given number of classes without manual assistance. This technique utilizes a neural network. FIG. 1 shows a conventional self-organizing pattern classification system that adopts such a pattern classifying technique. The system uses a learning vector quantization 2 (LVQ2) selector such as shown by Teuvo Kohonen, Gyorgy Barna, and Ronald Chrisley, "Statistical Pattern Recognition with Neural Networks: Benchmarking Studies", *Proceedings of IEEE International Conference on Neural Networks*, Jul. 24–27, 1988, Vol. 1, pp. 61–68.

In FIG. 1, the classification system includes N input nodes 2, each serving as a buffer for receiving a respective element Si of an input pattern signal S having N elements: S1, S2, . . . , SN, where N and i are positive integers. The classification system also includes M intermediate nodes 3, where M is a positive integer. Each intermediate node 3 receives a copy of the N-dimensional input pattern signal from the N input nodes 2 via signal lines 8 and generates an intermediate output 10. The significance of the intermediate output will be discussed below. Additionally, the system has an LVQ2 selector 4 for receiving the M intermediate output signals 10 from the M intermediate nodes 3 via signal lines 9. The LVQ2 selector 4 receives a teaching signal 6 from an external device and generates a response signal 5 indicating the correct class of input. The selector 4 also generates a learning signal 7 which is sent to the intermediate nodes 3 via signal lines 11.

An example of the input pattern signal S of N elements S1, S2, . . . , SN is a signal resulting from the pre-processing or feature extracting process used in character recognition techniques. This input pattern includes information such as geometric moments and topological features as described by W. E. Weiderman, M. T. Manry and H. C. Yau in "A Comparison of A Nearest Neighbor Classifier and A Neural Network For Numeric Handprint Character Recognition," *Proceedings of International Joint Conference on Neural Networks*, Jun. 18–22, 1989, Vol. 1, pp. 117–120. The input pattern may also be the product of voice recognition strategies or the product of target recognition strategies. In general, the input pattern may consist of various forms of audio or visual data. Reference is made hereinafter to a character pattern solely for illustrative purposes.

FIG. 2 shows a structure of the i-th intermediate node Ui, which includes N element comparators 12. Each of the element comparators 12 receives a respective element of the input signal S. Each element comparator 12 compares an element Sj of the input pattern S with a corresponding weighting factor vector element Wij and squares the difference between the input element and the corresponding weighting factor vector element. The element comparator 12 transfers the squared difference to the adder 13 via a signal line 15. The adder 13 sums all of the squared differences from the respective element comparators 12 and transmits the summation result to the square root computer 14 via a signal line 16. The square root computer 14 calculates the square root of the summation result and forwards the square root as the output signal Oi of the intermediate node Ui over line 9. As a result of the operations performed by the above-described element, the intermediate output Oi of the i-th intermediate node Ui is given by the following expression:

$$Oi = (1/N)\sqrt{\left(\sum_{j=1}^{N}(Sj - Wij)^2\right)} \quad (1)$$

wherein Sj is the j-th scalar element of an input pattern signal S and Wj is the j-th scalar element of the weighting factor Wi stored in the i-th intermediate node Ui.

The conventional system operates in either a "recognition mode" or a "learning mode." In the recognition mode, an input pattern signal S consisting of N elements S1, S2, . . . , SN is separated into and identified as being within a class. In particular, the system of FIG. 1 receives N elements S1, S2, . . . , SN of an input pattern signal S, determines a class to which the input pattern signal S belongs, and outputs the class in a response signal 5. In the learning mode, the weighting factor vector Wi of an intermediate node Ui is modified to correctly classify the input pattern signal S.

In recognition mode, the response signal 5 corresponds to the class information which has been determined by this system. For example, when the system is requested to classify 26 English capital letters A–Z, it outputs information about each one of the 26 classes A–Z as a response signal 5. This is accomplished by comparing the weighting factors in the intermediate node 3 to the input pattern signal S as described above. That is, the weighting factors for each class serve as a template representation of the characteristics of the letter that the class represents. Each intermediate node 3 has N weighting factors held in its respective element comparators 12 which serve as a template representation of a particular class. The number of intermediate nodes 3 used is greater than the number of classes to be recognized because two or more intermediate nodes represent the distribution of pattern signals for each class. Each node represents a different template for the same class. For example, as shown in FIG. 3a, there are various different representations of letters that are, nevertheless, all directed to the same letter. Thus, all five representations of the letter "A" in FIG. 3a fall in the same class, but each representation of "A" has a separate template encoded in a unique intermediate node.

Another way of highlighting that different intermediate nodes hold templates of the same class is to view each template as a vector. In FIG. 3b, a simplified version of the vectors for the letters A and B is depicted. This figure assumes for illustrative purposes only, that each template is a vector having only 2 scalar elements ($X_1$, $X_2$). In FIG. 3b, there are three intermediate nodes Ua1, Ua2, and Ua3, representing the letter "A" and four intermediate nodes Ub1, Ub2, Ub3, and Ub4 representing the letter "B".

The output value Oi of the i-th intermediate node Ui given by expression (1) is equivalent to the Euclidian distance in a vector space between an input pattern signal vector S (wherein each element of input is a scalar element of the vector) and a template vector represented by the weighting factors Wij (j=, 1, 2, ..., N). Thus, the smaller the output value Oi, the closer (i.e. the less the Euclidian distance) the input pattern signal vector S and the template vector represented by the weighting factors Wij are in the vector space. Based on this concept, the LVQ2 selector 4 selects the intermediate node Ukmin which gives the minimum output value as the closest intermediate node to the input pattern signal S and outputs the class name for the intermediate node Ukmin as a response signal 5. In FIG. 3b, if S is an input pattern signal represented as a point in the vector space, the distances to the points representing the intermediate nodes Ua1-Ua3 and Ub1-Ub4 are Oa1-Oa3 and Ob1-Ob4, respectively. The intermediate node Ua1 gives the minimum distance Oa1. Consequently, the system outputs, as a response signal 5, the class corresponding with the letter "A" as encoded in the weights of the intermediate node Ua1.

In the learning mode, the response signal 5 determined in the above recognition mode is compared with the teaching signal 6 which indicates the correct class of the input signals. If the comparison indicates that the response signal is wrong, the values of weighting factors of the element comparators 12 are changed to effect learning. More specifically, the LVQ2 selector 4 compares the class name of the response signal 5 as determined in the recognition mode with the correct class name given by the teaching signal 6. If the signals are not identical, the weighting factor correction process is performed. That is, the smallest value and the second smallest value are detected among the output values 10 of all intermediate nodes 3, and it is determined whether the following conditions are satisfied. If the following learning conditions are satisfied, the weighting factors of the element comparators 12 specified by the learning signal 7 via signal line 11 are changed according to expression (3) below.

The learning conditions are as follows. Ui is the intermediate node which provides the smallest output value Oi (determined to be the closest to the input pattern signal S), and Uj is the intermediate node which provides the second smallest output value Oj (determined to be the closest node to the input pattern signal S except for Oi). Ui and Uj belong to different classes Ci and Cj (Ci ≠Cj), respectively. S does not belong to the class Ci but belongs to the class Cj and falls within the window specified by the following expression:

$$Oj-Oi \leq th2 \quad (2)$$

wherein th2 is a predetermined threshold constant.

The weighting factors in the intermediate nodes Ui and Uj are modified as follows:

Weight of Ui: $Wik(t+1)=Wik(t)-\alpha(t)[Sk-Wik(t)]$

Weight of Uj: $Wjk(t+1)=Wjk(t)+\alpha(t)[Sk-Wik(t)]$ for $k=1, \ldots N$ (3)

wherein t is the time expressed in monotonically increasing integer (t=1, 2 . . . ); $\alpha(t)$ is a monotonically decreasing function having a sufficiently small value such as $\alpha(t)=1/(t+1)$.

The intermediate node Ui determined to be closest to the input pattern signal S is of a class which is different from the correct class, whereas the intermediate node Uj determined to be second closest to the input pattern signal S is of the correct class. The expression (2) implies that the input pattern signal S falls within the window area W of FIG. 4. The window W has a width of th2 around the border line between the neighboring templates encoded by the weighting factors of intermediate nodes Ui and Uj. These template vectors are depicted as circle 220a and 220b in FIG. 4a. If the input pattern signal vector 5 falls into this window area W, the input pattern lies in the border area of neighboring template vectors, and the input pattern signal cannot be distinguished correctly at a high rate.

In order to correct such a problem, the weighting factors of the intermediate node Ui are modified according to the modification set forth in the first part of expression (3). The modification of the weights separates the template represented by the weighting factors of the intermediate node Ui, having a class different from the input pattern signal S, in the vector space as shown by arrow ml in FIG. 4a. Likewise, the weighting factors of the intermediate node Uj are modified according to the second part of expression (3) so that the template represented by the weighting factors of the intermediate node Uj, having a class identical with that of the input pattern signal S, is adjusted in the direction of arrow m2 in FIG. 4a. The resulting adjusted weights resemble a pattern such as shown in FIG. 4b. Such learning activities are repeated until all of the weighting factors are organized to provide correct classification of the input pattern signal. The above learning mode is applied to all input pattern signals prepared for performing the learning operation and repeated until the weighting factor vector of the intermediate node no longer requires any correction according to expression (3). It is possible to accomplish this either in the learning mode alone or in the learning mode and the recognition mode in combination.

The pattern classification system using a neural network made by the LVQ2 learning technique is able to modify the weighting factors of an intermediate node so as to establish a recognition boundary between close classes in the pattern signal distribution. However, when an input pattern signal far apart from the template represented by the existing weighting factors is input, a wrong classification results and, the above window condition of expression (2) is not satisfied. Since the window condition is not satisfied, the learning activities of the above-described approach are impossible. In addition, where the classes Ci and Cj are determined to be the closest and second closest classes to the input pattern signal S and these classes are different from the correct class given by a teaching signal, the above-described approach fails. In particular, it does not provide correction of weighting factors of intermediate nodes. For this reason, the learning activities do not converge. Furthermore, when an input pattern signal of a class which has not yet been registered in the system is applied to the system as the input signal S, no learning takes place because there is no intermediate node of the proper class.

Accordingly, it is an object of the invention to provide a self-organizing pattern classification system which is able to learn from a wide variety of classes of input pattern signals.

SUMMARY OF THE INVENTION

The present invention provides a neural network self-organizing pattern classification system that is able to properly classify input patterns of data. The input patterns may be of many different forms including audio data and visual data. A primary example of such input pattern is character data wherein each character represents a respective class. The neural network is provided with intermediate nodes for comparing the input pattern to templates of already learned patterns. These templates may be realized as weights wherein a separate weight is provided for each element of the input pattern. Each template has a class associated with it, and there may be multiple templates sharing a common class. These intermediate nodes produce an output indicative of the comparison of the input pattern to the template. The outputs travel to output nodes of the respective class. Each class has a unique output node associated with it. The output node selects one of the templates whose output is forwarded to it. Preferably it selects the template that is most similar to the input pattern.

The output nodes each forward the node number and the value indicative of the similarity to the input pattern to a selector. The selector chooses one of these templates as the template to be selected. In particular, it chooses the class associated with that template as the class of the input. In the preferred embodiment, the template pattern is chosen that is most similar to the input pattern. The class associated with that template becomes the selected class.

The neural network is also provided for a means for determining whether a correct class was selected to the input signal. This means serves as a check and feedback mechanism for the system to learn new templates and to adjust its existing templates. When a correct classification is indicated by this means, the system does not simply accept this classification and proceed no further; rather it determines whether the classification has been stably classified. If the selected class is too similar to another class (i.e. the template patterns of the different classes are too similar), then future classifications will not be stable. Such future classifications will be classified erratically between the similar classes. To eliminate this problem, the present invention determines whether the selected class has a template that is too similar to the template of the correct class. If it is too similar, the system adjusts the templates to ensure their separation and stable classification.

If an incorrect classification is made, the neural network system is provided for the means for determining whether a template of a correct class exists. It is also provided with a means for creating a template of a new class when the template of the correct class does not exist. In addition, when a template of the correct class does exist but the correct class template is dramatically different from the input pattern signal template, the system provides a new template of the correct class that is more similar to the input pattern signal. Lastly, the neural network is provided with a means for determining whether the selected class is too similar to the correct class when an incorrect class is selected. This means for determining, triggers a means for adjusting the template of the selected class to separate it from the template of the correct class so as to ensure proper classification.

BRIEF DESCRIPTION OF THE DRAWINGS

FIGS. 11A, 11B, and 11C are flow charts illustrating how the system of FIG. 5 works.

DETAILED DESCRIPTION OF THE PREFERRED EMBODIMENTS

Figure 1:
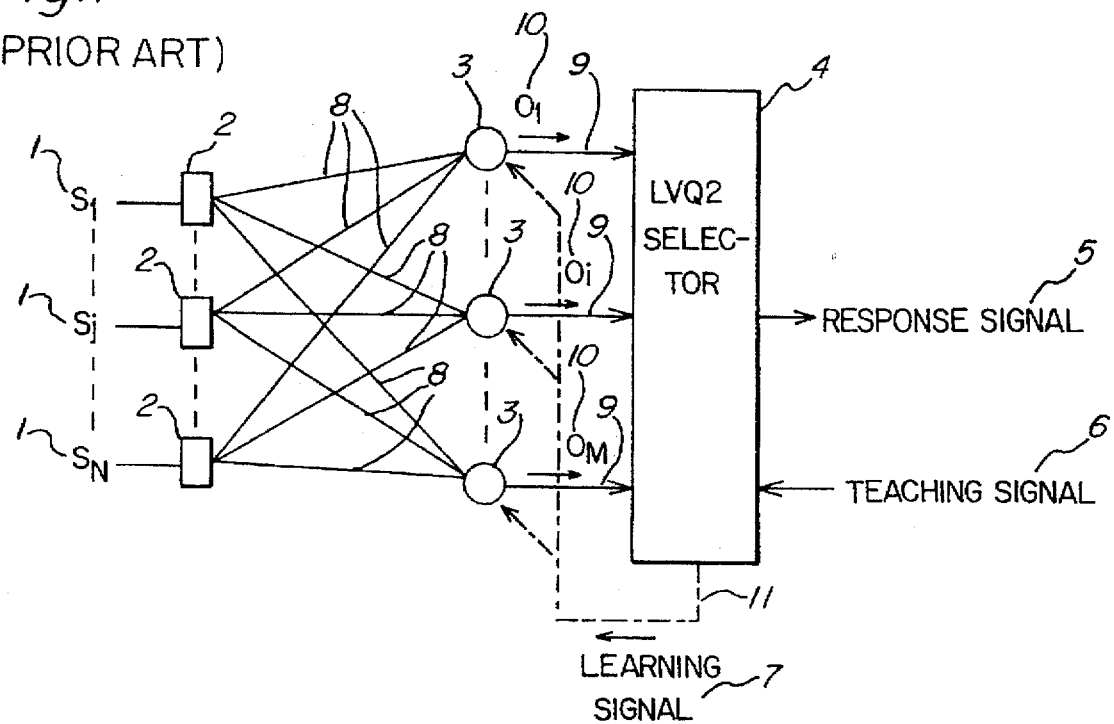
FIG. 1 is a block diagram of conventional self-organizing pattern classification system.
Figure 2:
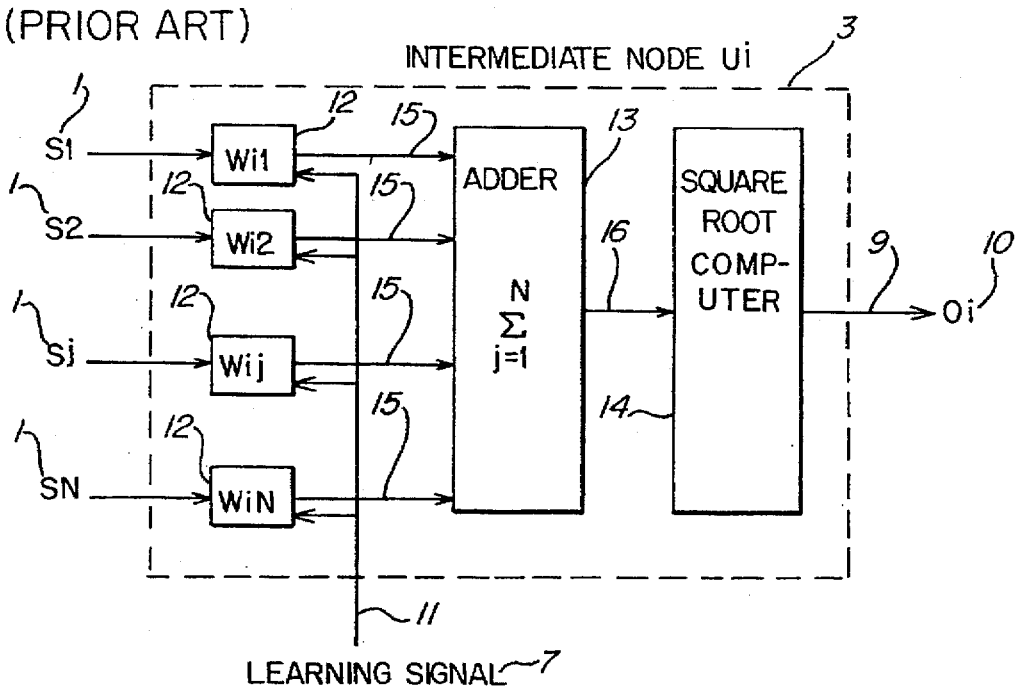
FIG. 2 is a block diagram of an intermediate node for the system of FIG. 1.
Figure 3A:
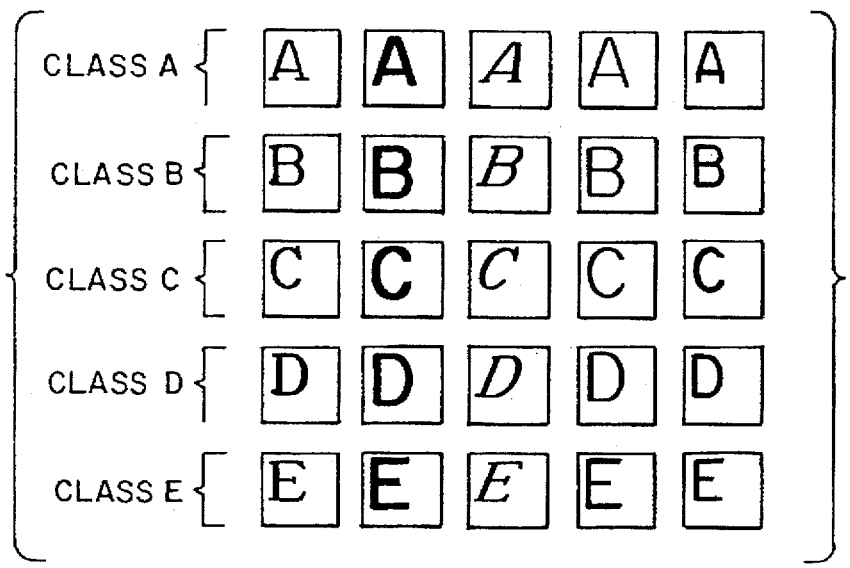
FIG. 3a depicts different template patterns representing English letters for respective classes of letters.
Figure 3B:
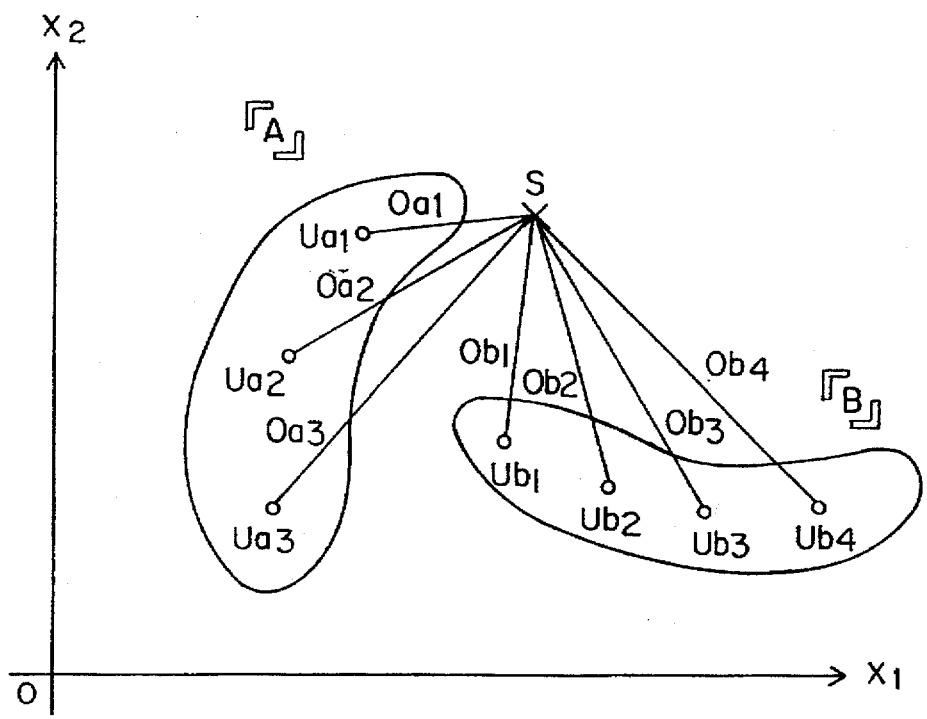
FIG. 3b depicts intermediate nodes and the input signals as vectors in a vector space.
Figure 4A:
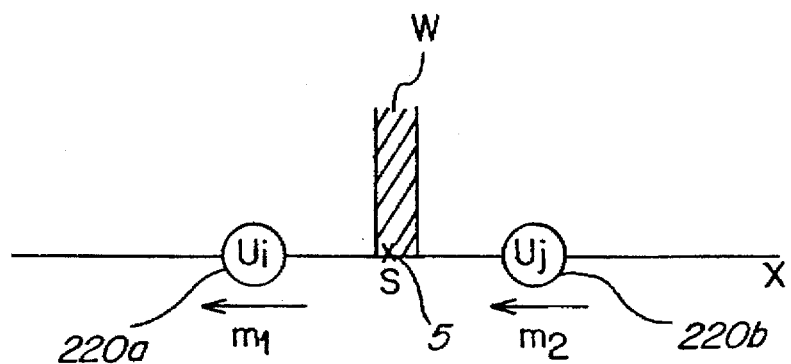
FIGS. 4a and 4b are plots illustrating how weights are adjusted to remove ambiguity in the classification of an input pattern signal S.
Figure 4B:
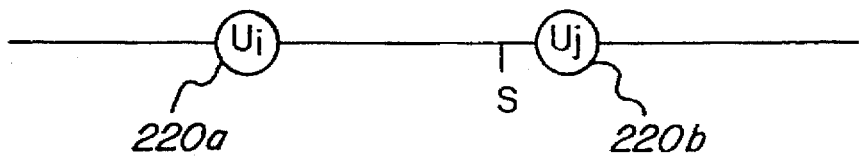
Figure 5:
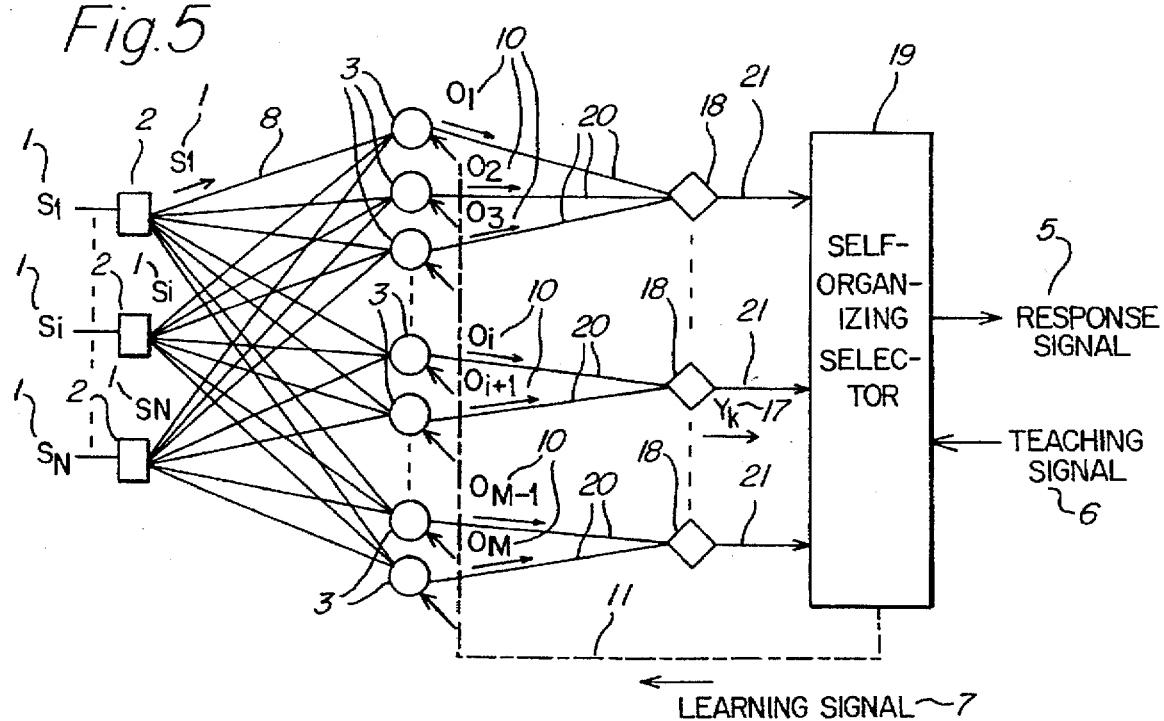
FIG. 5 is a block diagram of a self-organizing pattern classification system according to an embodiment of the invention.

FIG. 5 shows a neural network for self-organizing pattern classification. The network includes N input nodes 2, where N is a positive integer, serving as buffers for receiving an input pattern signal S. The input pattern signal may be audio or visual input. For instance, the input pattern may be a character pattern, an audio pattern or a target pattern. The input signal S includes N elements denoted as S1, S2, . . . , SN. The network also includes M intermediate nodes 3, where M is a positive integer, for receiving the N-dimensional input pattern signal S from the N input nodes 2 via signal lines 8. Each of these intermediate nodes 3 is like those depicted in FIG. 2, which are used in the conventional system described in the Background section. The M intermediate nodes each process the input signal S to generate an output value 10. The network additionally includes output nodes 18 for receiving the output values 10 sent from the intermediate nodes of a same class via signal lines 20. Each output node 18 has a unique class associated with it and receives only output values from the intermediate nodes of the same class. The output nodes 18 determine the minimum value amongst the received output values 10, and outputs the intermediate node number (serving as an identifier) of the intermediate node that sent the minimum value along with the minimum value 10 as a class output signal 17. Lastly, the network includes a self-organizing selector 19 for outputting a response signal 5 and a learning signal 7 based on the class output signal 17. These signals are derived from a response signal 5 and a teaching signal 6. The learning signal 7 is transmitted to the intermediate nodes 3 via signal lines 11.

As in the conventional system described in the Background section, this system operates in either a recognition mode, wherein an input pattern signal S is classified into a corresponding class, or a learning mode wherein the weighting factor vectors of intermediate nodes 3 are modified.

When the network is in the recognition mode, the input nodes 2 each receive N elements S1, S2 . . . , SN of an input pattern signal S in the same way as the elements are received in the conventional system as described in the Background section. The intermediate nodes 3 generate intermediate output values 10 in accordance with expression (1). In particular, the output values each equal the square root of the sum of the squares of the differences between elements of the input pattern signal and the corresponding weight Wij. The output values 10 are transferred via the signal lines 20 to the output node 18 which is assigned the class represented by the intermediate nodes. The output node 18 selects, as an intermediate node representative of the class, an intermediate node which provides the minimum value output among the output values 10 transferred from the intermediate nodes. The output node 18 transfers this output value as a class signal 17 to the self-organizing selector 19 via the signal line 21. The self-organizing selector 19 determines which output node 18 provided the minimum value class signal among the class signals sent from the output nodes 18. The selector 19 outputs the class name represented by the output node as the response signal 5.

In the learning mode, the weighting factors of the element comparators 12 are corrected using the class signal 17 sent from an output node 18 sending the minimum value output, the response signal 5, and the teaching signal 6 given from the outside after the same process is performed in the recognition mode. Specifically, the weights of the element comparators are updated as specified in expression (3). This network differs from the conventional system in that it operates so that the weighting factors of the element comparators 12 are corrected even in the case where the class name indicated by the response signal 5 is identical with the class name indicated by the teaching signal 6. The network, likewise, corrects the weighting factors when there is a mismatch between the class indicated by the response signal 5 and the teaching signal 6.

Figure 6:
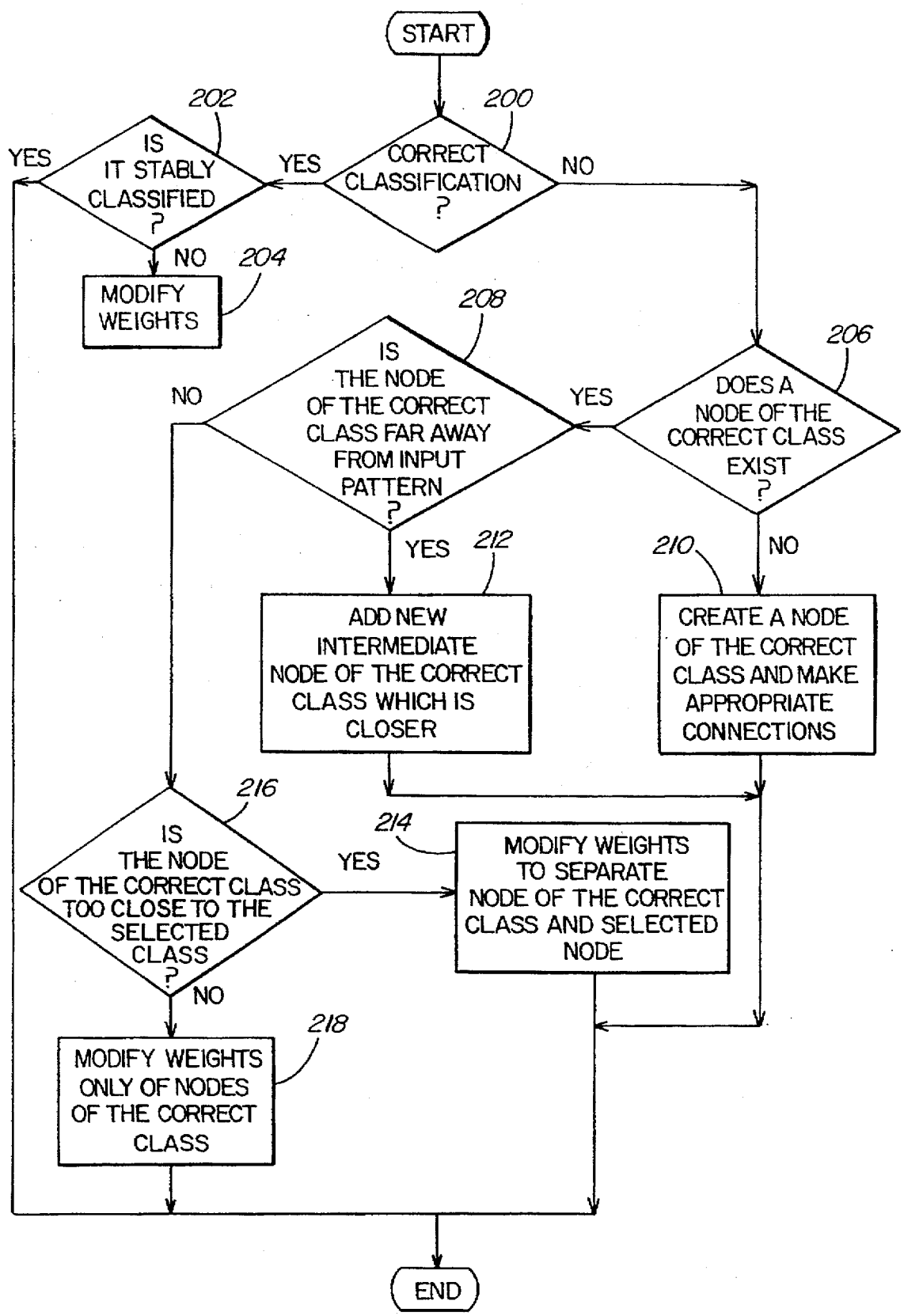
FIG. 6 is a flow chart of steps performed by the network to assure correct and stable classification.

FIG. 6 is a flow chart of the steps the system takes to assure correct and stable classification. To properly correct the weighting factors, the self-organizing selector 19 compares the correct class name given by the teaching signal 6 with the class name given by the response signal 5 which is produced as a result of classification of the input pattern signal 1 (Box 200 in FIG. 6). If the class name indicated by the response signal 5 is identical with the correct class name given by the teaching signal 6, it is then determined whether the classification is stable (Box 202). In determining whether the classification is stable, the self-organizing selector 19 detects an output node 18 which gives the second smallest value among the values received from the output nodes 18. The selector 19 then determines the intermediate node 3 from which the second smallest value originated and also determines the output value Oi of that intermediate node 3. Subsequently, the selector 19 compares the output value Oi with the output value Oj of the intermediate node Uj representative of the correct class determined from the output node 18 of the correct class under the following expression:

$$Oi - Oj \leq th2 \qquad (4)$$

wherein th2 is a predetermined threshold constant. The value of th2 defines the window W discussed in the Background section relative to conventional systems. The value of th2 is determined by calculating the standard deviation σ of input pattern sample data in a class. For example, an input pattern signal sample data set for 10 classes is used in order to determine the value of th2 for the input pattern signal data. After the standard deviators $\sigma_1, \sigma_2, \ldots, \sigma_{10}$ are calculated, the value of th2 is calculated as follows:

$$th2 = 1/100 * 1/10 \sum_{i=1}^{10} \sigma_i \qquad (5)$$

The value of th2 may be subsequently adjusted by experiment.

Expression (4) implies that the output value Oj of the output node Uj (representative of the correct class) is so close to the output value Oi of the intermediate node Ui (representative of a wrong class) that the weighting factors stored in the intermediate nodes Ui and Uj are easily confused. For this reason, if expression (4) is satisfied, the weighting factors of the intermediate nodes Ui and Uj are modified as indicated by expression (3) (Box 204).

If the class name indicated by the response signal 5 is different from the correct class name given by the teaching signal 6, the weighting factors of the intermediate nodes are corrected so that the correct classification is realized. The improper classification may be due to one of the following:

(1) The input signal is of a class which is not included in the system.

(2) The input pattern signal S is far apart in the vector space from the template represented by the weighting factor vector of the intermediate nodes, which belong to a correct class.

(3) In the vector space, there is a weighting factor vector stored in an intermediate node, having a class other than the correct class, which is close to the weighting factor vector stored in intermediate nodes of the correct class.

Figure 7:
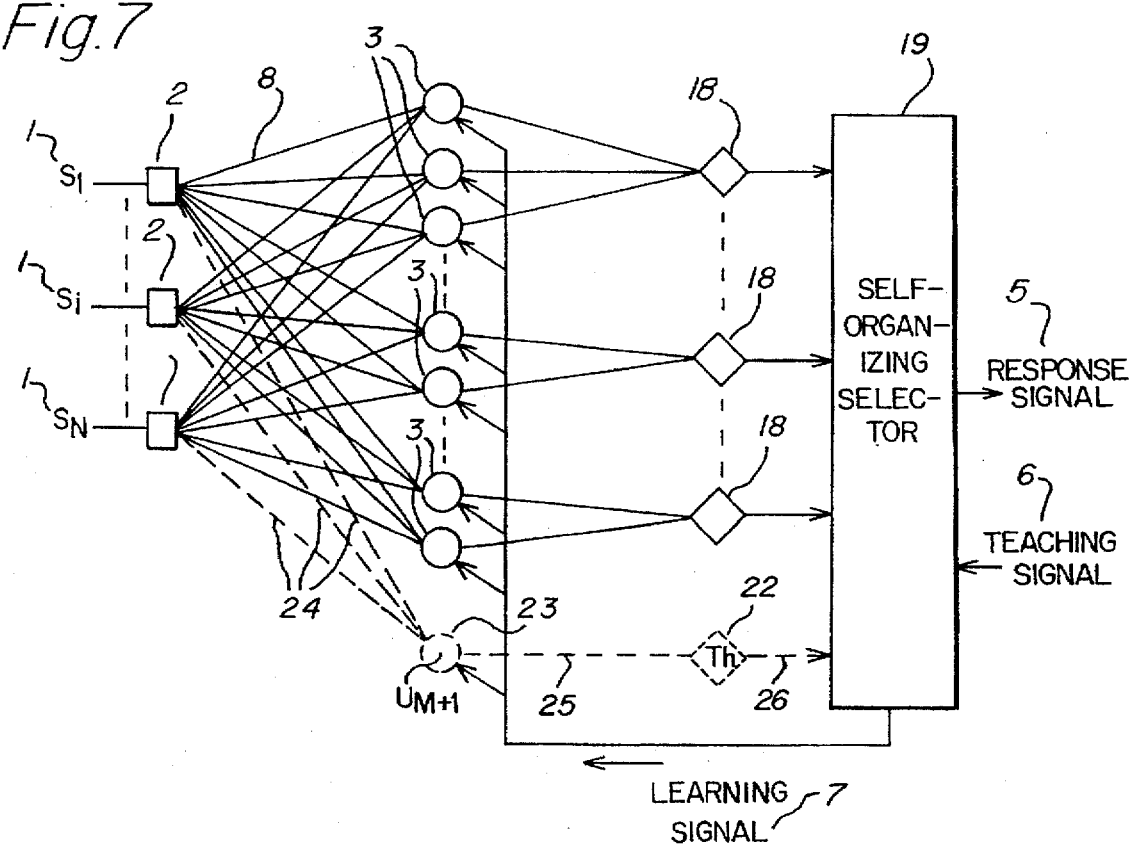
FIG. 7 is a block diagram showing how the system of FIG. 5 creates new intermediate and output nodes where there is no output node of the correct class.

If there is no output node having a class matching the class given the teaching signal 6 (Box 206), an output node Th 22 of the correct class, is added to the network (Box 210 in FIG. 6) as depicted in FIG. 7. Also added are an intermediate node UM+1 23, signal lines 24 for connecting input nodes 2 to the intermediate node UM+1 23, a signal line 25 for connecting the intermediate node UM+1 23 with the output node Th 22 of the right class, and a signal line 26 connecting the output node 22 and the self-organizing selector 19 as shown in FIG. 7. The weighting factors of the intermediate node 23 are realized by assigning respective elements of an input pattern signal to the intermediate node UM+1 23. Furthermore, a new class name is registered in the output node Th 22.

If there is an output node having a class which is identical to the correct class, the self-organizing selector 19 determines whether an output value Oj of an intermediate node Uj of the class obtained from the output node of the correct class satisfies the following expression:

$$Oj \geq th1 \qquad (6)$$

wherein th1 is a predetermined threshold constant.

The constant th1 is a criterion value for checking whether the input pattern signal vector S is far from the template vector represented by the weighting factor of the correct class intermediate node which has the smallest output value among correct class intermediate nodes. Hence, th1 can be viewed as a criterion distance in a vector space. The approximate value of th1 can be determined by calculating the standard deviation $\sigma$ of the input pattern signal sample data within one class. For instance, the input pattern signal sample of 10 classes may be used to determine th1 for the given input pattern signal. After the standard deviations for the 10 classes $\sigma_1, \sigma_2, \ldots, \sigma_{10}$ are determined, th1 is calculated as follows:

$$th1 = 3 * 1/10 \sum_{i=1}^{10} \sigma_i \quad (7)$$

The value of th1 may be subsequently adjusted by experiment.

Figure 8:
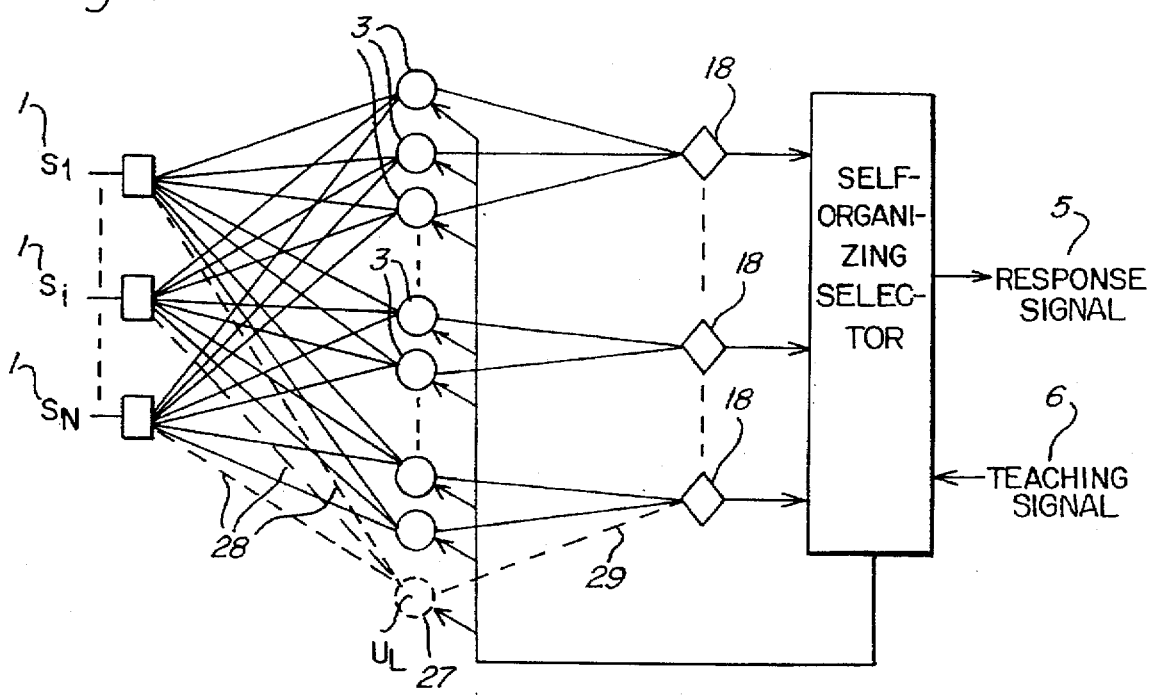
FIG. 8 is a block diagram showing how the system of FIG. 5 creates a new intermediate node where expression (6) is satisfied.

Expression (6) is useful for determining whether the distance in a vector space between the input pattern signal and the template represented by the weighting factor of the intermediate node Uj (representative of the correct class) is greater than the threshold constant th1 (which is a large number). If the output value Oj satisfies expression (6) (see Box 208 in FIG.6), the input pattern signal S is necessarily far apart from the template represented by the weighting factor vector of an intermediate node of the correct class. Consequently, if expression (6) is satisfied, as in FIG. 8, an intermediate node UL 27, a signal line 28 for connecting the input node and the intermediate node UL 27, and a signal line 29 for connecting the intermediate node UL 27 to the output node of the correct class are added to the network (Box 212 in FIG. 6). The weighting factors of the intermediate node UL 27 are generated by assigning respective elements of the input pattern signal as the weighting factors.

If the class indicated by response signal 5 does not match the class indicated by the teaching signal 6 and there is an output having a class identical to the correct class but expression (6) is not satisfied, the output node Ui which gives the minimum value among the intermediate output values representative of the class indicated by the response signal 5 and its output value Oi are detected from the class output signals 17 sent from the output nodes 18. Further, it is determined whether this value Oi and the output value Oj of the intermediate node Uj (representative of the correct class obtained from the output node of the correct class) satisfy the following.

$$Oj - Oi \leq th2 \quad (8)$$

wherein th2 is a predetermined threshold constant as described above.

Satisfying expression (8) implies that the mismatch arises because the template represented by the weighting factors stored in the intermediate node of the correct class and the template of the weighting factors stored in the intermediate node of a class other than the correct class are too closely situated in the vector space (see Box 216 in FIG. 6). Thus, the weighting factors of the intermediate nodes Ui and Uj are modified according to the aforementioned weighting factor correction formula set forth in expression (3) (Box 214 in FIG. 6).

If the cause of the wrong classification is none of the above, only the weighting factor vector stored in the intermediate node Uj of the correct class is modified (Box 218 in FIG. 6 according to the following equation:

Weight of Uj: $Wjk(t+1) = Wjk(t) + \alpha(t)[Sk - Wjk(t)]$ for $k = 1, \ldots, N$ (9)

wherein t is the time expressed as a monotonically increasing integer (t=1, 2, ...). The function $\alpha(t)$ has a value lying between 0 and 1. It is a monotonically decreasing function that decreases with time t in a linear or expontential fashion. Hence, functions such as $(1/(t+1))$ or $e^{-t}$ may be used for $\alpha(t)$. The value of $\alpha(t)$ determines the magnitude of the updating of the weighting factors, and thus, can be viewed as a feedback value in an automatic control field. If too large of values are chosen for $\alpha(t)$, the neural network may experience instability. Accordingly, small values of $\alpha(t)$ are preferred to heighten stability. Moreover, $\alpha(t)$ is a decreasing function to reflect the increasing stability of weights with each successive update.

Figure 9:
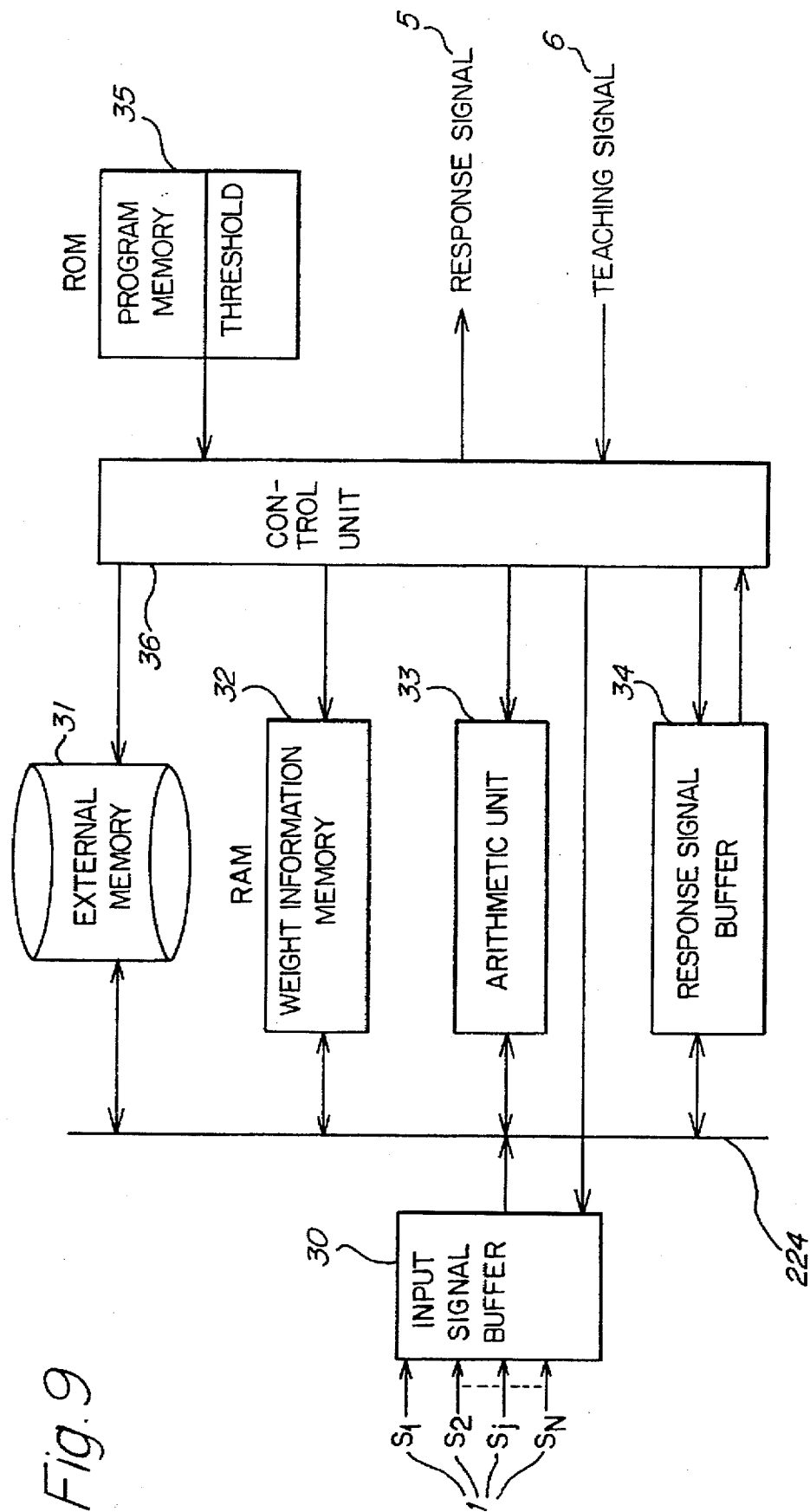
FIG. 9 is a block diagram of a self-organizing pattern classification system using a sequential processor according to an embodiment of the invention.

FIG. 9 shows an example of a neural network classification system which is implemented with a sequential digital computer, such as a microprocessor like the Motorola MC 68030, according to an embodiment of the invention. This system includes an input signal buffer 30 for storing an input pattern signal. This buffer corresponds to the input nodes 2 of FIG. 5. The system also includes an external memory 31, such as a magnetic disk, for saving the weighting factors of intermediate nodes 3 (FIG. 5) and the class information of the output nodes 18 (FIG. 5); further a random access memory (RAM) 32 is provided for facilitating additional storage of the weighting factors of intermediate nodes 3 (FIG. 5) and the class information of the output nodes 18 during operation of the network. An arithmetic unit 33 consisting of arithmetic devices, such as adders and multipliers and logic units for computing the output values and modifying the weighting factors is provided. This implementation of the system additionally includes an output signal response buffer 34 for storing the results. The external memory 31, input signal buffer 30, RAM 32, arithmetic unit 33 and response signal buffer are all coupled to a bus 224 that facilitates communication amongst these components. A read only memory (ROM) 35 is also included in the system for storing constants such as the initial threshold value to make a decision on learning conditions and executable programs; and a control unit 36.

Figure 10:
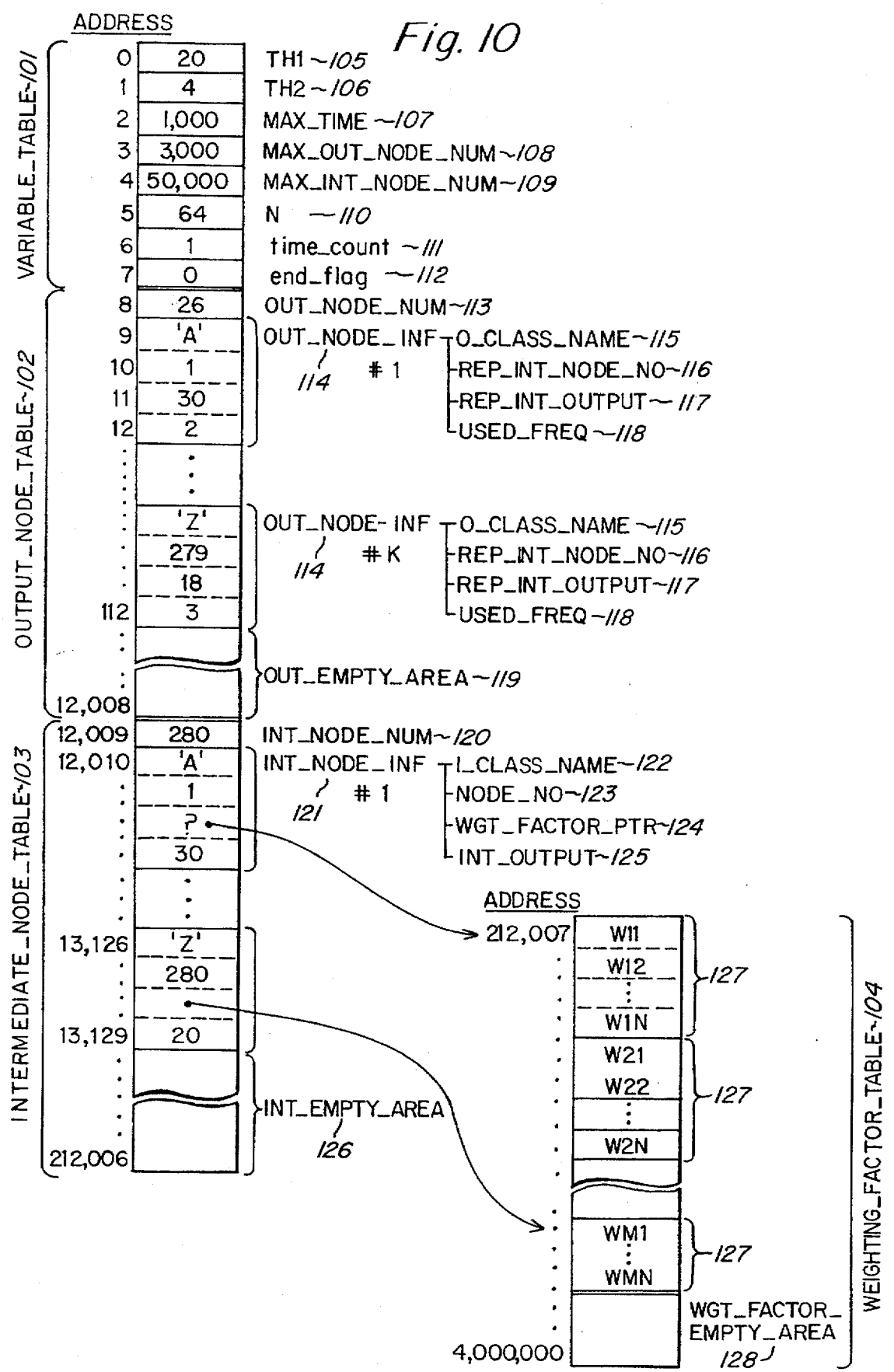
FIG. 10 is a diagram illustrating how intermediate nodes, output nodes and control variables of the neural network are stored in memory.

FIG. 10 shows how the output nodes, intermediate nodes and weighting factors are held in memory for systems such as that depicted in FIG. 9. FIG. 10 also shows the variable table 101 for holding variables of the software program that is executed on the system of FIG. 9. A copy of the a prototype program is attached as a microfiche appendix and for illustrative purposes, the discussion that follows will make reference to the program that is attached as a microfiche appendix.

The memory space, as depicted in FIG. 10, includes four tables: VARIABLE_TABLE 101, OUTPUT_NODE_TABLE 102, INTERMEDIATE_NODE_TABLE 103 and WEIGHTING_FACTOR_TABLE 104. The VARIABLE_TABLE holds the current values for a number of different variables and constants. For instance, the constant th1 105 is shown as being stored at address 0 and having a value of 20. Likewise, the constant th2 106 is stored at address 1 and has a value of 4. These constants are the threshold values referenced above in expressions (7) and (5), respectively.

Other variables held in the variable table include MAX_TIME 107 which refers to the maximum number of learning cycles. Also included in the variable table 101 are MAX_OUT_NODE_NUM 108, which refers to the maximum number of output nodes that are allowed, and MAX_INT_NODE_NUM 109, which refers to the maximum number of intermediate nodes. Additionally, VARIABLE_TABLE 101 holds a value for the variable N. The value of N indicates the number of elements in the input signal vector VARIABLE_TABLE 101 also has a value for time count 111, which keeps tabs on the current learning times. The VARIABLE_TABLE 101 lastly, includes the end_flag variable 112 whose significance will be provided below when the prototype program is discussed in more detail. Each of these variables and constants are defined within the attached microfiche appendix.

The memory space also includes an OUTPUT_NODE_TABLE 102. This table 102 is used to store the information necessary for creating output nodes. At the beginning of the output node table is the value of the variable OUT_NODE_NUM 113, which indicates the number of output nodes held in the table. In the example provided in FIG. 10, twenty six output nodes are contained in the table. After this initial value indicating the number of output nodes in the table, the table includes a set of records, wherein a single record is allocated for each output node in the network. These records are designated as OUT_NODE_INF 114. Each such record includes a number of fields. In particular, each record includes a field designated as O_CLASS_NAME 115 which indicates the output class name of the output node represented by the record. The records also include a field designated as REP_INT_NODE_NO 116 and REP_INT_OUTPUT 117 which hold the node number producing the minimum intermediate output and the value of the lowest intermediate output, respectively. Lastly, these records contain a field designated as USED_FREQ 118, which indicates how often that class of the output node is selected as the class of the input signal. The output node table 102 also has an empty area designated as OUT_EMPTY_AREA 119.

The INTERMEDIATE_NODE_TABLE 103 is where the records for the intermediate nodes are held. At the beginning of the table is a value INT_NODE_NUM 120, which indicates the number of intermediate nodes in the table. In an example provided in FIG. 10, there are 280 nodes held in the intermediate node table. After the value indicating the number of intermediate nodes held in the table, is a series of records wherein each record represents a separate intermediate node. The records are denoted as INT_NODE_INF 121. These records contain a number of fields holding useful information about the intermediate nodes. A first field, denoted as I_CLASS_NAME 122 which indicates the class of the intermediate node. For the example shown in FIG. 10 for the first record in the intermediate node table 103, the class is the English letter "A". The record also includes a field designated as NODE_NO 123. This field indicates the node number of the intermediate node represented by the record. The node number is usually an integer value, and the node numbers typically follow a monotonically increasing sequence.

The record also includes a pointer to a weighting factor table entry. This field is denoted as WGT_FACTOR_PTR 124. The pointer points to a particular block of weight values 127 for that intermediate node. In particular, it points to the beginning of such a block. Each block contains N entries corresponding to the N elements of the input signal. Lastly, the record for the intermediate node contains the value designated as INT_OUTPUT 125 which holds the output value of the intermediate node.

The INTERMEDIATE_NODE_TABLE 103 also has an empty area in many instances, designated as INT_EMPTY_AREA 126. The size of this area will vary during the execution and will vary among applications.

The memory also holds a WEIGHTING_FACTOR_TABLE 104 which was described above. It holds the blocks 127 of weighting factors for each of the intermediate nodes. The pointers in the intermediate nodes point to the beginning of such respective blocks. Like the other tables, this table includes an empty area denoted as WGT_FACTOR_EMPTY_AREA 128. The role of these data structures will become more apparent in the discussion of the software below.

Figure 11B:
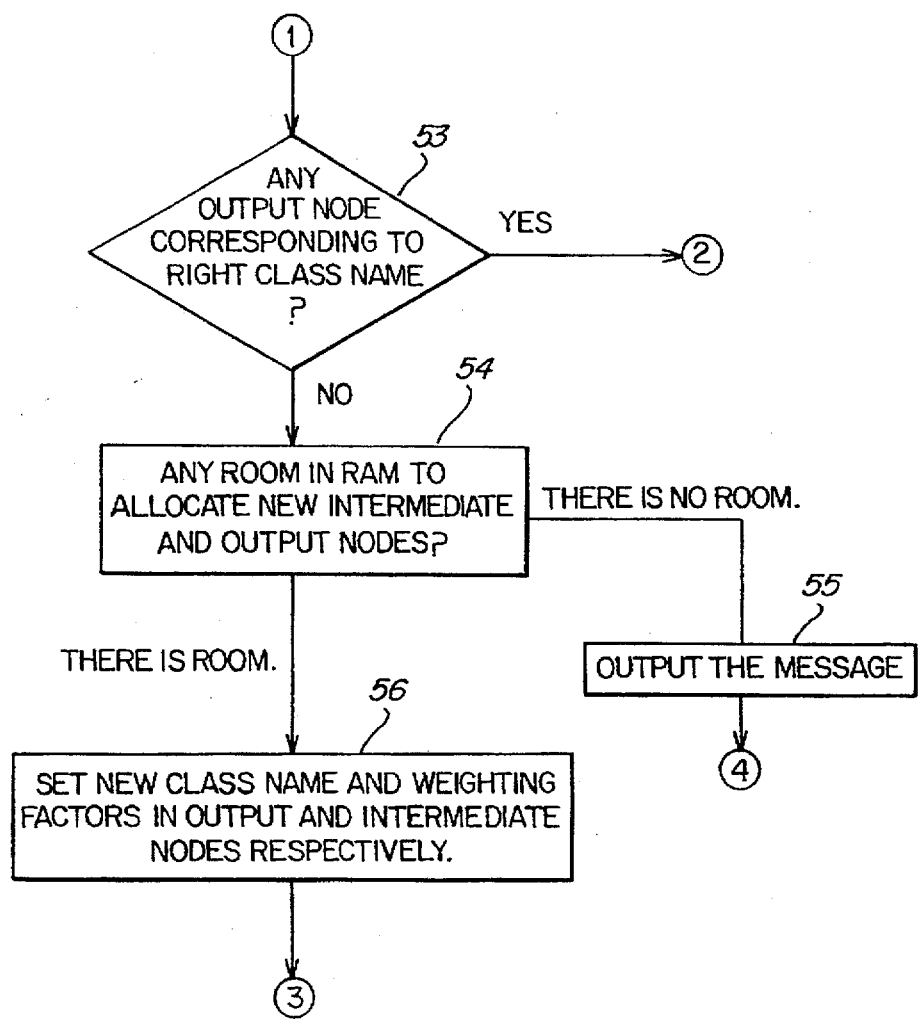

FIGS. 11A, 11B, and 11C show how the single processor data processing system of FIG. 9 operates when in the learning mode. When the program is run, whether the information of the intermediate and output nodes is loaded into the RAM 32 (FIG. 9) from the external memory 31 (FIG. 9) is checked by control unit 36 (FIG. 9) based on the contents of OUTPUT_NODE_TABLE 102 (FIG. 10) and INTERMEDIATE_NODE_TABLE 103 (FIG. 10) in RAM 32 (FIG. 9) (Block 37 in FIG. 11A). If it is not loaded, the system determines whether the data of information of the intermediate and output nodes is stored in the external memory 31 (FIG. 9) (Block 38 in FIG. 11A). If it is stored in external memory 31 (FIG. 9), the information is loaded into the RAM 32 (FIG. 9) from the external memory 31 (FIG. 9) (Block 39 in FIG. 11A). If there is no such data in the external memory 31 (FIG. 9), the RAM is initialized by setting values for OUT_NODE_NUM 113 (FIG. 10) and INT_NODE_NUM 120 (FIG. 10) (Block 40). Then, the learning end flag (end_flag 112 in FIG. 10) is turned off, and the number of times of learning loop (time count 111 in FIG. 10) is set to 1 (Block 41 in FIG. 11A).

Then, the following numbered steps are repeated until the end_flag is switched on (at Block 70 in FIG. 11C).

(1) end_flag 112 in FIG. 10 held in RAM 32 (FIG. 9) is turned on a first time (Block 42 in FIG. 11A) by control unit 36 (FIG. 9).

(2) The input pattern signal pointer of the input signal buffer 30 (FIG. 9) is set so as to read the first input pattern signal for effecting learning (Block 43 in FIG. 11A). This is done by the procedure rewind_input_pattern_pointer (see attached appendix).

Figure 13:
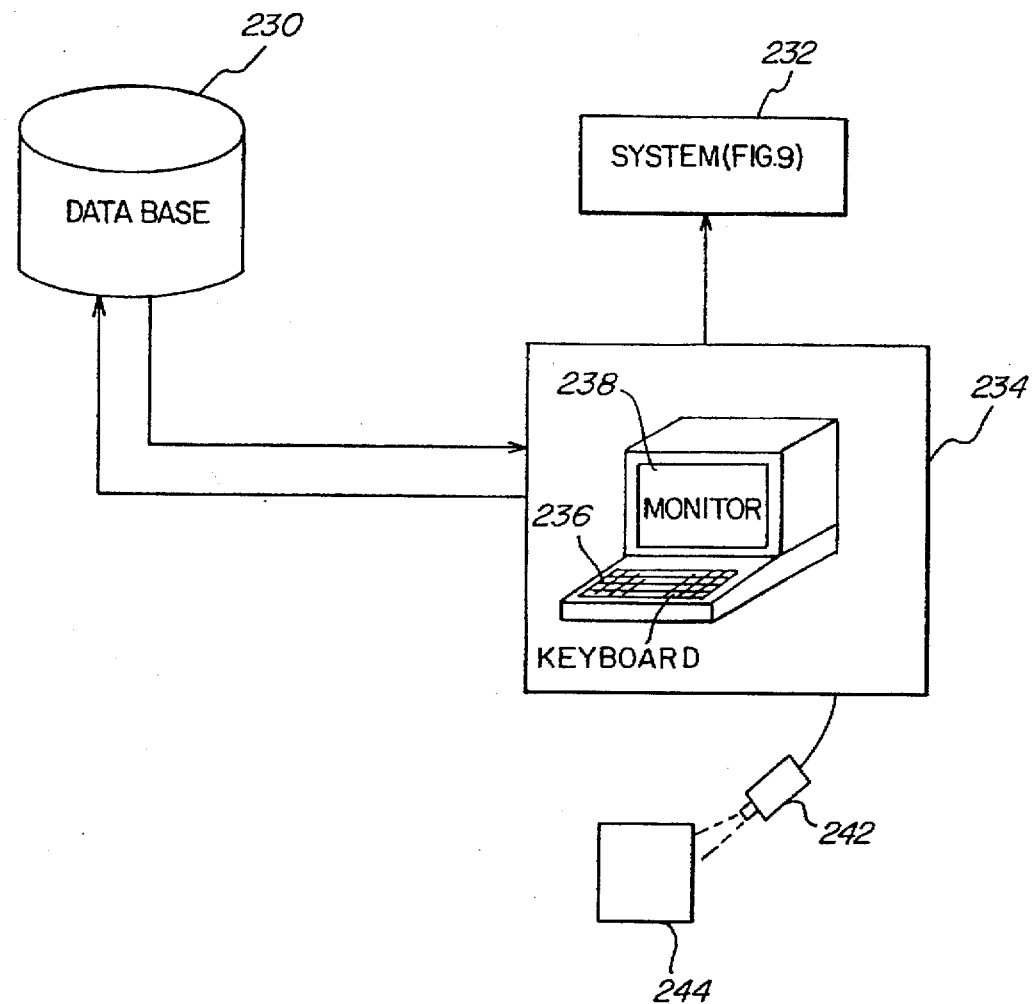
FIG. 13 is a block diagram of an example image reading system used to provide input signals to the system of FIG. 9.
Figure 14:
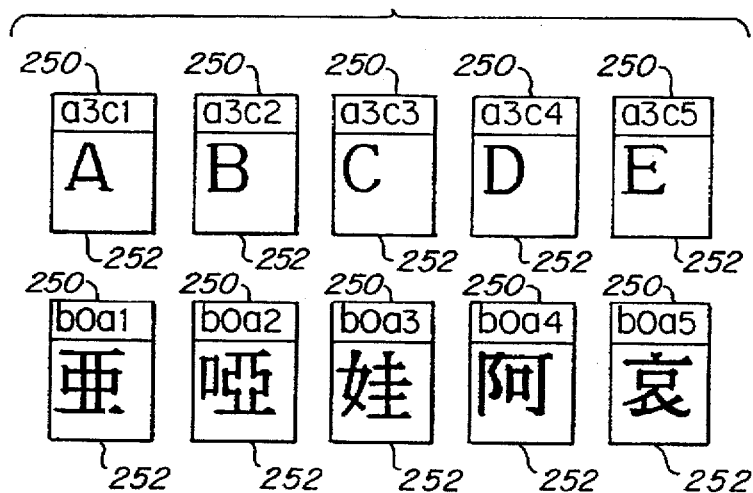
FIG. 14 is a depiction of the data structure of character input to the system of FIG. 9.

(3) The input pattern signal is read by the input device of FIG. 13 (see get_input_pattern_signal procedure in the appendix) and stored in the input signal buffer 30 (FIG. 9) (Block 44 in FIG. 11A). FIG. 13 provides a depiction of the components used to read the input utilized by the system of FIG. 9. In particular, an object 244 to be classified such as a character, is scanned by an input means 242 such as a video camera in the instance of recognition of a character. The video input enters a data terminal 234 having a keyboard 236 and a monitor 238. The terminal 234 enables a user of the system to interact with the various components. The terminal 234 is connected with the system 232 of FIG. 9. It is also coupled to a data base 230 wherein numerous different character patterns and other patterns are stored. The utility of the data base will be described in more detail below. In the instance of character recognition, the input data structure is like that depicted in FIG. 14. The data structure is comprised of two parts. The first part 250 indicates a class name of the input signal. The second part 252 is a pixel pattern indicating the pixels read from the video camera 242. As can be seen in FIG. 14, all of the characters shown therein have the same data structure but have different pixel patterns.

(4) The weighting factors 104 (FIG. 10) of intermediate nodes stored in RAM 32 (FIG. 9) and the input pattern signals stored in the input signal buffer 30 (FIG. 9) are computed in the arithmetic unit 33 (see the procedures cal_dis_euclid and calculate_intermediate_node_output in the appendix) according to expression (1) to determine all the output values of the intermediate nodes, which are stored in INT_OUTPUT 125 (FIG. 10) in RAM 32 (FIG. 9) (Block 45 in FIG. 11A).

(5) The minimum value among the output values of the intermediate nodes of a class stored in REP_INT_OUTPUT 117 (FIG. 10) in RAM 32 (FIG. 9) is determined by the arithmetic unit 33 and a control unit 36 (FIG. 9) based on the values of INT_OUTPUT 125 (FIG. 10) and I_CLASS_NAME 122 (FIG. 10) in RAM 32 (FIG. 9), and this intermediate node number and output value are stored in the REP_INT_NODE_NO 116 and REP_INT_OUTPUT 117 (FIG. 10) in RAM 32 (FIG. 9) as an output class signal of the intermediate node of the class (see the procedure calculate output_node_output in the appendix) (Block 46 in FIG. 11A).

(6) The class name for the output node which outputs the minimum value is determined by the arithmetic unit 33 and a control unit 36 (FIG. 9) (see the procedure detect_response signal in the appendix) as an output response signal (Block 47 in FIG. 11A) based on the value of REP_INT_OUTPUT 117 (FIG. 10) in RAM 32 (FIG. 9).

(7) The correct class name of the input pattern signal is read from the input device of FIG. 13 as a teaching signal 6 (Block 48 in FIG. 11A).

(8) It is determined by the control unit 36 (FIG. 9) whether the class name of the input teaching signal is identical with the class name of the response signal (Block 49 in FIG. 11A). If it is not identical, the process jumps to Step 13.

(9) The intermediate node number i and the output value Oi of the output node which gives the second smallest value and the intermediate node number j and the output value Oj of the output node of the correct class are detected by control unit 36 (FIG. 9) (Block 50 in FIG. 11A) (see the procedure detect_Oi_Oj in the appendix).

(10) Whether the intermediate outputs Oi and Oj satisfy the aforementioned expression (4) is determined by arithmetic unit 33 and control unit 36 (FIG. 9) (Block 51 in FIG. 11A). If expression (4) is not satisfied, the process jumps to step 27.

(11) If expression (4) is satisfied, the weighting factors of the intermediate nodes Ui and Uj which are stored in WEIGHTING_FACTOR_TABLE 104 (FIG. 10) in RAM 32 (FIG. 9) are corrected according to expression (3) (Block 52 in FIG. 11A) (see the procedure modify_Oi_Oj in the appendix).

(12) The process jumps to step 26.

(13) It is determined whether there is an output node for the correct class by control unit 36 (FIG. 9). If there is one, the process jumps to step 17 (Block 53 in FIG. 11B).

(14) The area for storing new OUTPUT_NODE_INF 114, INT_NODE_INF 121 and WEIGHTING_FACTOR 127 (FIG. 10) in RAM 32 (FIG. 9) is allocated (Block 54 in FIG. 11B). If there is no room for the allocation (i.e. there is no OUT_EMPTY_AREA 119 in OUT_NODE_TABLE 102 or no INT_EMPTY_AREA 126 in INTERMEDIATE_NODE_TABLE 103 or no WGT_FACTOR_EMPTY_AREA 128 in WEIGHTING_FACTOR_TABLE 104 (FIG. 10)), a message is output by control unit 36 (FIG. 9) (Block 55 in FIG. 11B), and the process jumps to step 27 (see the procedures add_output_node and add_intermediate_node in the appendix).

(15) The values of respective elements of the input pattern signal in input signal buffer 30 (FIG. 9) are stored in the weighting factors which are newly added to WGT_FACTOR_EMPTY_AREA 128 (FIG. 10) of the allocated intermediate nodes (Block 56 in FIG. 11B), and the new class name is placed into O_CLASS_NAME 115 (FIG. 10) which is newly added to OUT_EMPTY_AREA 119 (FIG. 10). The new class name is also placed into I_CLASS_NAME in INT_EMPTY_AREA 126 (FIG. 10).

(16) The process jumps to step 26.

(17) If the control unit 36 (FIG. 9) finds that output value Oj of the intermediate node Uj which outputs the minimum value among the intermediate nodes of the correct class does not satisfy the above expression (6), the process jumps to step 21 (Block 57 in FIG. 11C).

(18) A new intermediate node corresponding to the class of the input pattern signal is added in INT_EMPTY_AREA 126 (FIG. 10) (see add_intermediate_node in the appendix); INT_NODE_INF 121 (FIG. 10) record for the new intermediate node is allocated in RAM 32 (FIG. 9) (Block 58 in FIG. 11C) by control unit 36 (FIG. 9). If there is no room for the allocation, a message indicating the absence of available memory space is output by control unit 36 in FIG. 9, and the process jumps to step 27.

(19) The values of respective elements of the input pattern signal in input signal buffer 30 (FIG. 9) are stored in the weighting factors 127 (FIG. 10) which are newly added to WGT_FACTOR_EMPTY_AREA 128 (FIG. 10) of the allocated intermediate nodes (Block 60 in FIG. 11C) in RAM 32 (FIG. 9).

(20) The process jumps to step 26.

(21) The intermediate node number i and the output value Oi corresponding to the output node which gives the smallest value among the output values obtained from REP_INT_OUTPUT 117 (FIG. 10) in RAM 32 (FIG. 9) are determined by control unit 36 (FIG. 9) (see the procedure detect_Oi_Oj in the appendix), and the intermediate node number j and the output value Oj obtained from the output node of the correct class stored in OUTPUT_NODE_TABLE 102 (FIG. 10) are determined by control unit 36 (FIG. 9)(Block 61 in FIG. 11C).

(22) It is determined by control unit 36 (FIG. 9) whether the output values Oi and Oj satisfy expression (8) (Block 62 in FIG. 11C). If expression (8) is not satisfied, the process jumps to step 25.

(23) If expression (8) is satisfied, the weighting factors of the intermediate nodes Ui and Uj are modified according to expression (3) (Block 63 in FIG. 11C) by control unit 36 and arithmetic unit 33 (FIG. 9) (see modify_Oi_Oj_weighting_factor in the appendix).

(24) The process jumps to step

(25) The weighting factors of the intermediate node Uj, which are stored in WEIGHT_FACTOR_TABLE 104 (FIG. 10) in RAM 32 (FIG. 9), are modified (see modify_Oj_weighting_factor in the appendix) according to expression (9) (Block 64 in FIG. 11C) by control unit 36 and arithmetic unit 33 (FIG. 9).

(26) end_flag 112 (FIG. 10) is turned off (Block 65 in FIG. 11C).

(27) It is determined by control unit 36 (FIG. 9) whether all of the learning input pattern signals have been processed. If not, the process jumps to step 3 (Block 66 in FIG. 11C).

(28) time_count 111 (FIG. 10) is incremented by 1 (Block 67 in FIG. 11C).

(29) When time_count 111 (FIG. 10) exceeds the predetermined value of MAX-TIME 107 (FIG. 10), end_flag 112 (FIG. 10) is turned on (Blocks 68 and 69 in FIG. 11C) by control unit 36 (FIG. 9).

(30) If end_flag 112 (FIG. 10) is off, the process jumps to step 1 (Block 70 in FIG. 11C).

(31) The learned neural network information shown in FIG. 10 is stored in the external memory 31 (FIG. 9) (Block 71 in FIG. 11C).

(32) The learning activity is ended.

Figure 12:
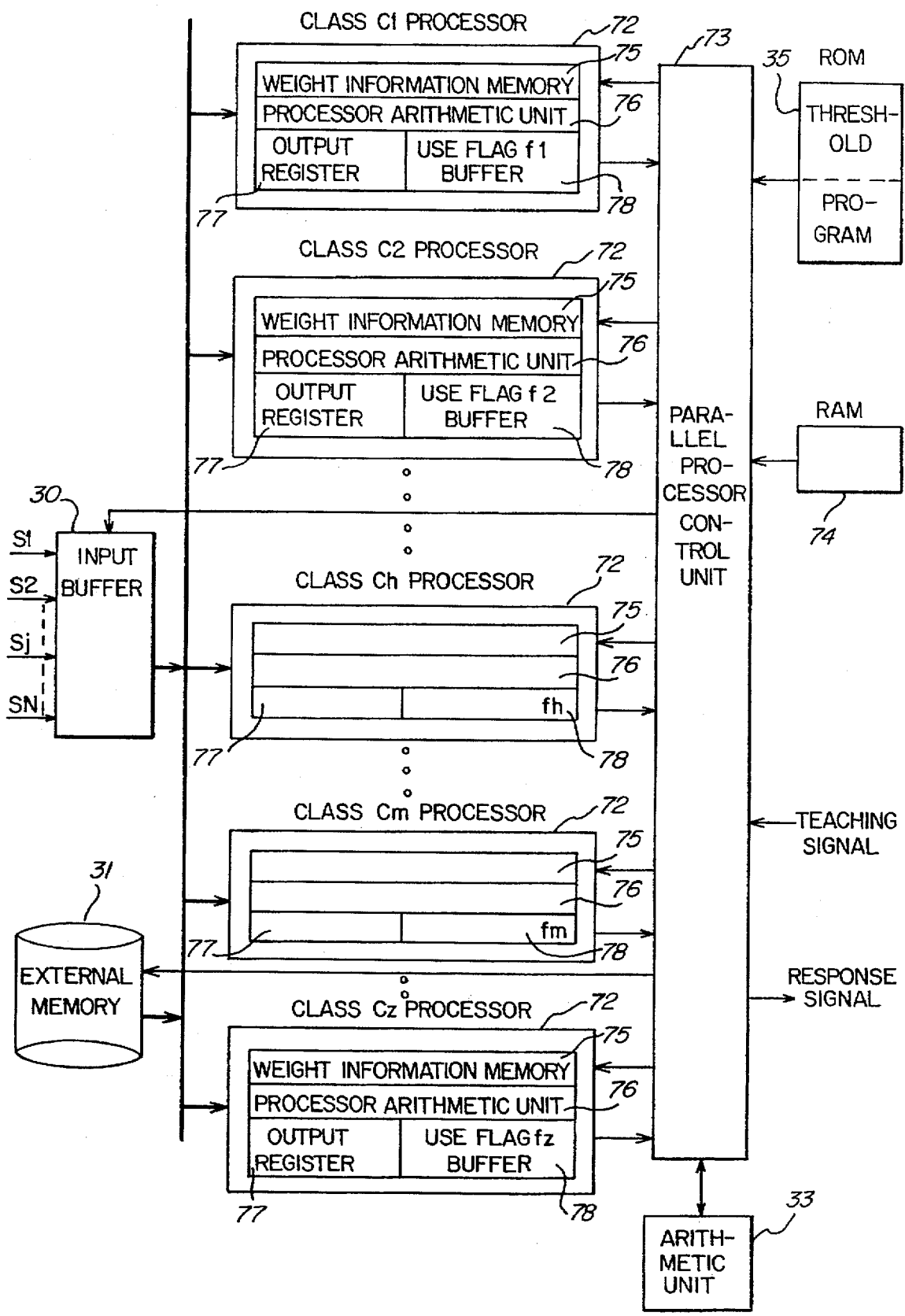
FIG. 12 is a block diagram of a self-organizing pattern classification system using a parallel processor according to an embodiment of the invention.

The neural network of the present invention may also be realized in a parallel processing system. FIG. 12 shows an example parallel processing system like that described in Dan Hammerstrom, "AVLSI Architecture for High-Performance, Low-Cost, On-Chip Learning," *Proceedings of International Joint Conference On Neural Networks*, Jun. 17–21, 1990, Vol. 2, pp. 537–544. This system includes an input buffer 30 for storing an input pattern signal and an external memory 31, such as a magnetic disk, for saving the information about intermediate node weighting factors and output nodes. The system also includes a plurality of processor elements 72 that each compute the output values of intermediate and output node of each class. A ROM 35 is provided in the system for storing the initial threshold values and for storing execution programs that make decisions on the learning conditions. In addition, the system includes a parallel processor control unit 73, an arithmetic unit 33, and a RAM 74 for storing the computation results. Each processor element 72 consists of a RAM 75, a processor arithmetic unit 76, an output register 77, and a use flag buffer 78 for indicating whether the processor element is valid or not.

In this system, one processor element is allocated to compute the output values of intermediate nodes of a class and the output class signal of an output node 18 in FIG. 5. Thus, the system computes the output values of intermediate nodes 3 and the class signals 17 of output nodes 18 in parallel as shown in the flow chart of FIGS. 11A, 11B and 11C. To learn an input pattern signal which is not registered in an output node, the system searches a processor element that has been invalidated by the use flag once such a processor element is found, new intermediate and output nodes are allocated in this processor element, and the use flag is set to be valid. With this system, it is possible to perform high-speed pattern classification because of the parallel computation capability of the system.

Alternatively, the intermediate node computation, which has been made by the Euclidian distance method as defined by expression (1) in the above embodiment, may be made by determining the inner product of vectors given by the similarity probability Pi (which is well know in the pattern recognition field), as follows:

$$Pi = \sum_{j=1}^{N} (sj * wij) / \left[ \left( \sqrt{\sum_{j=1}^{N} sj^2} \right) * \left( \sqrt{\sum_{j=1}^{N} wij^2} \right) \right] \quad (10)$$

wherein Sj and Wij are as previously described.

Figure 15:
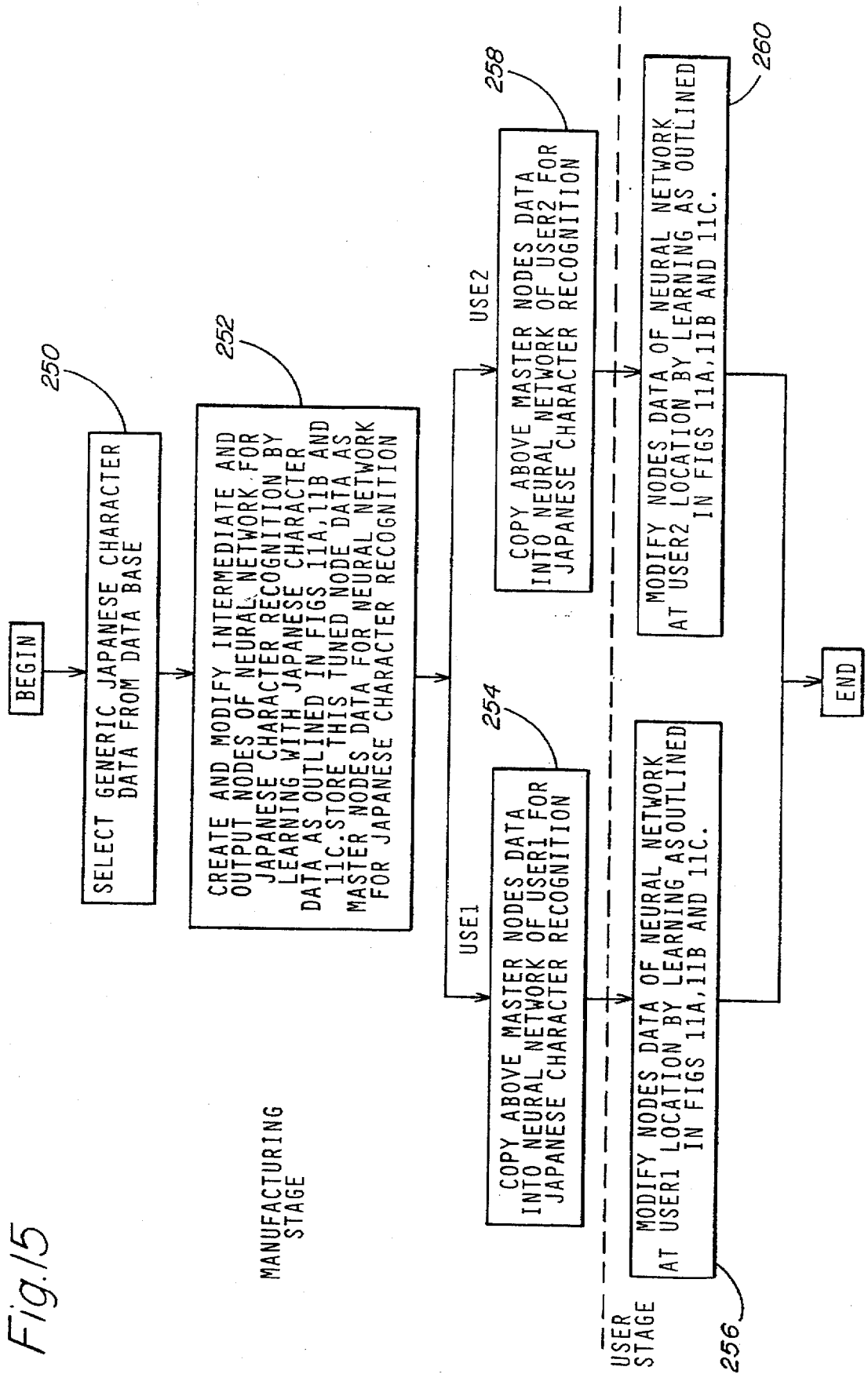
FIG. 15 is a flow chart of the steps of development of the self-organizing neural network pattern classification system of the present invention.

The above described creation and adaptation of a neural network system takes place as an evolving process. In general, the steps associated with adjusting a data processing system to properly recognize classes are divided into a manufacturing stage and a user stage. FIG. 15 presents a flow chart of the steps involved in the manufacturing stage and the user stage. For illustrative purposes, this flow chart assumes that the system is being utilized for character recognition. As mentioned above, however, the system may also be used for audio pattern recognition and target recognition. The reference to character recognition is purely illustrative. In the first step of the manufacturing stage, the generic training data is installed for character recognition. This data is derived from a universal data base that holds all information the system requires for character recognition, audio pattern recognition and target pattern recognition. In installing the generic training data for character recognition, the portion of the data in the universal data base concerning character recognition is selected from data base 230 in FIG. 13. (Box 250).

Figure 16:
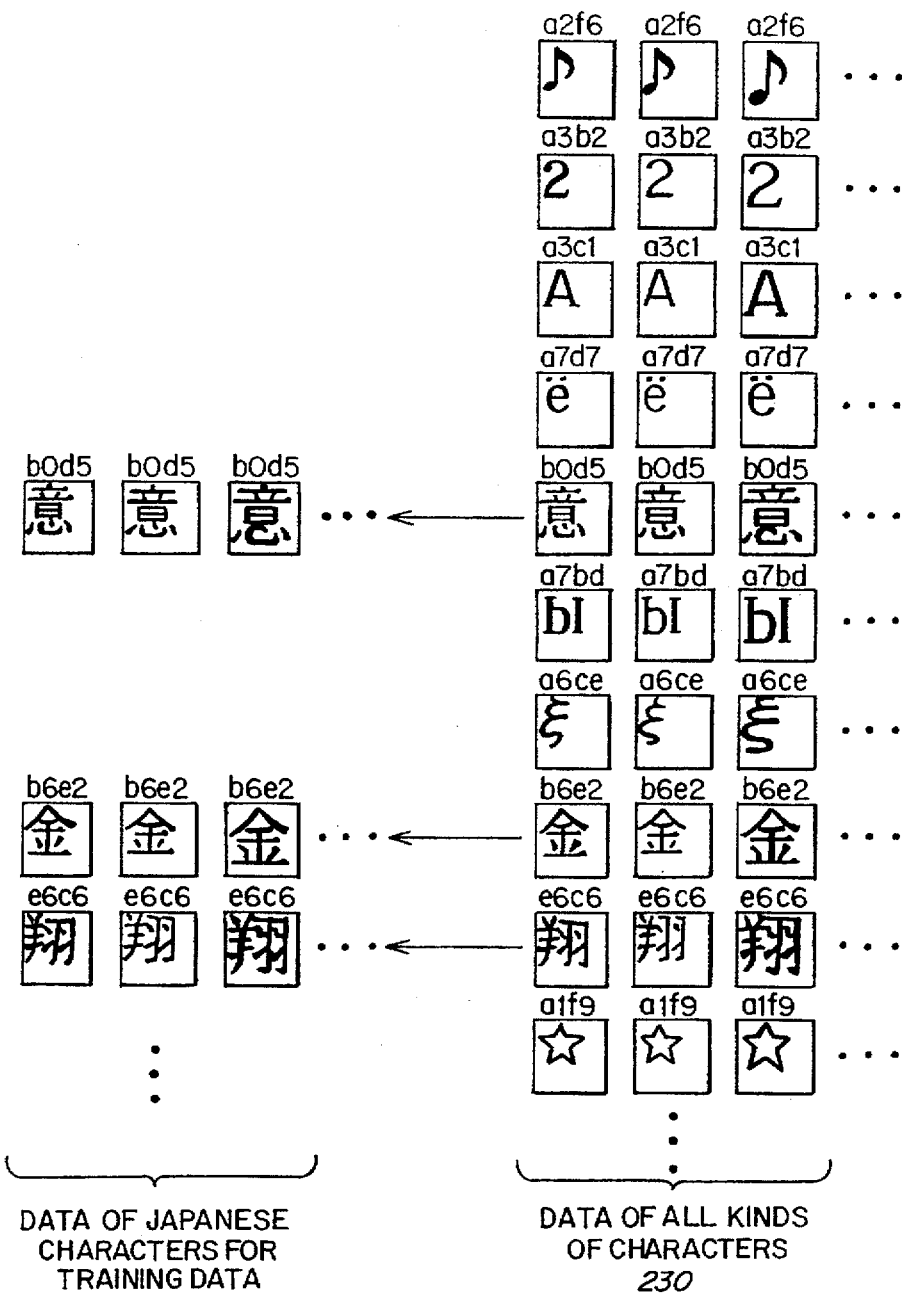
FIG. 16 is a depiction of the generic character database and the generic training data of Japanese characters.

Once the generic training data is selected from data base 230. this data is applied to a neural network that initially has no intermediate nodes and no output nodes. This neural network then creates and modifies intermediate nodes and output nodes by learning with the generic training data as outlined in FIGS. 11A, 11B and 11C. For instance, to create a neural network for Japanese character recognition, the generic training data of Japanese characters 270 is selected from data base 230 (FIG. 16). Then, a neural network tunes the information of intermediate and output nodes with the generic training data of Japanese character as outlined in FIGS. 11A, 11B and 11C.

The information of the tuned intermediate and output nodes of the neural network are stored as master nodes data for a neural network for Japanese character recognition. This master tuned data is used for all systems that are to be manufactured for Japanese character recognition. Once this master data base is created, copies of the data base can be installed for separate users as noted in boxes 254 and 258 in FIG. 15, hence. facilitating mass production of the systems. In particular, the master data base is loaded into the external memory 31 (FIG. 9) of the system to be sent to the respective users. In the case of FIG. 15, the data base is installed in the external memories of the system for user1 and user2. These steps 250, 252, 254 and 258 constitute the manufacturing stage.

Figure 17:
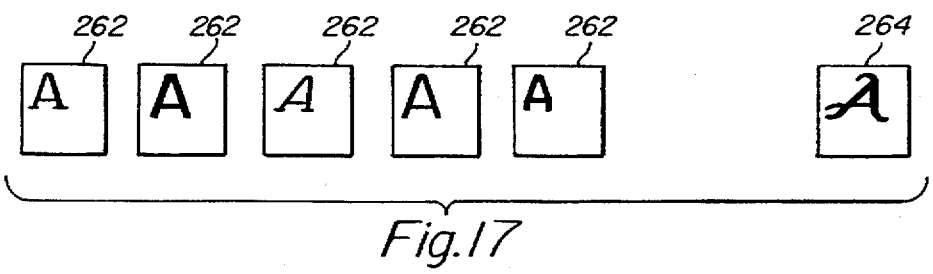
FIG. 17 is a depiction of different fonts of the letter A.

In the user stage (comprised of steps 256 and 260), the data installed for the user system is modified or "re-tuned" at the user's private location. These privately tuned data are installed into the external memory of the user system. An example of the type of tuning that might occur is the creation of special fonts. As FIG. 17 points out, the system may be provided in the manufacturing stage with a template 262 for the class "A". The user, however, may wish to modify the template so that there is also a template like template 264. Both of these templates would be within the same class (i.e. the letter A), but the data would have to be tuned so as to learn the template 264.

In general, when the data sets are installed in the manufacturing stage, each particular character pattern is applied to a neural network that initially has no intermediate nodes. The system then learns the character template that is being input and creates an appropriate intermediate node for that template. In this fashion, all of the input is learned to create respective intermediate node templates. This is what is being done in box 252. However, in the user stage of boxes 256 and 260, intermediate nodes already exist for representations of the classes. What is being added is new intermediate nodes or modifications of existing template patterns. For instance, if in step 256, user1 wishes to have a system that is already configured for Japanese to learn German, the system learns to recognize the German characters by applying the German characters to the neural network. This application to the system causes the learning or creation of new templates for the German character patterns. These will be kept along with the already known Japanese characters.

It should be noted that the resolution of the input pattern is important in this instance. Japanese characters have very subtle differences between each other and, hence, the input data must be of high resolution (i.e. a large number of pixels) to distinguish the subtle characteristics. The German characters, on the other hand, do not have such subtle characteristics and, thus, do not need as high of a resolution. Since the system is already configured for Japanese, the system is configured for high resolution and, thus, the lower resolution required for German characters does not pose a problem. In contrast, if the system was initially configured for German having a lower resolution, the learning of Japanese characters could be probmatic. One solution is to provide high enough resolution for all of the languages. This, however, is an efficiency trade-off and it should be determined on a case-by-case basis. Furthermore, the input data structures for any types of data character target or audio pattern data may be made uniform so that a single system configuration may respond to all types of pattern recognition.

Figure 18:
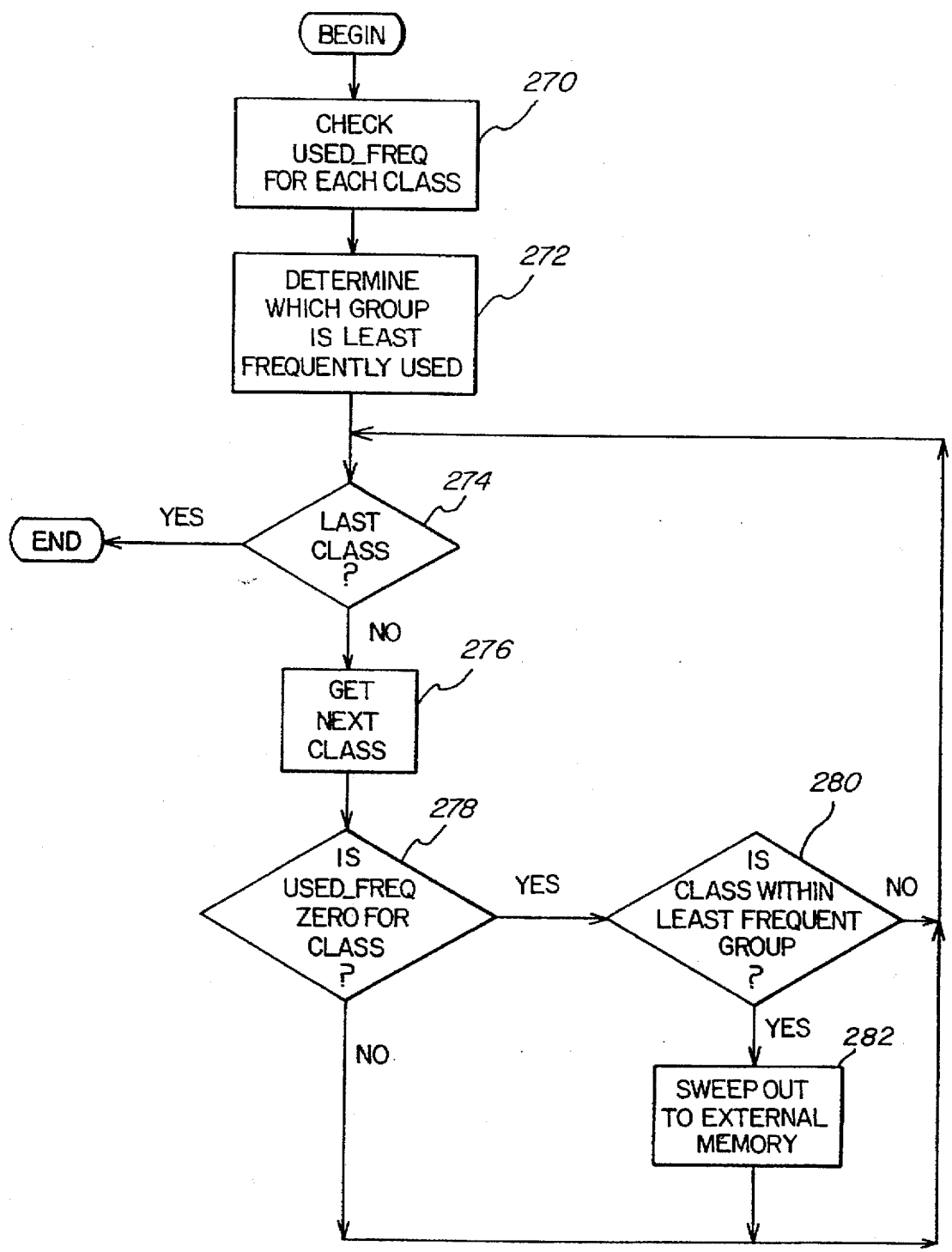
FIG. 18 is a flow chart of the steps of the sweeping out process.

In view of the above discussion of the system's ability to learn different character sets, another system feature needs to be discussed. In accordance with a preferred embodiment, portions of memory that are not used frequently may be swept out from the internal RAM 32 (FIG. 9) and transferred to the external memory 31 (FIG. 9). In particular, the output nodes 18 that are infrequently used (i.e. infrequently selected as the class of the input pattern) and intermediate nodes corresponding to the above output nodes, are transferred to the external memory. In an activity that is analogous to paging, the store data in the external memory 31 is fetched and transferred back to the internal memory 32 when they are required again. A flow chart of the sweeping out operation is presented in FIG. 18. Specifically, the field USED_FREQ 118 in FIG. 10 is checked for each class (Box 270). As mentioned above, this field is incremented every time that class is selected as the class of the input. The system also determines which group is least frequently used (Box 272). The groups refer to the different language sets in this instance. More generally, each group is a different set of data for applications other than character recognition. Primary examples in the present instance are Japanese characters and German characters.

The system then looks at each of the output nodes, first checking to see if the last class has been reached (Box 274). If the last class has not been reached, it then gets the successive next class (Box 276) and checks to see whether the USED_FREQ field has a zero value (Box 278). If it does not have a zero value, the next class is examined. If, however, it does have a zero value, the system checks to see whether the class is within the least frequent group (Box 280). If the class is within the least frequent group, the output node and the corresponding intermediate nodes are swept out to external memory (Box 280). If it does not lie within the least frequent group, the class is not swept out. This approach presumes that those within the selected group will eventually be used and hence, should be kept within the internal memory.

This sweeping-out function operates at regular intervals, such as every 1000 characters input. In learning mode, if there is no node belonging to the correct class given by a teaching signal 6 in FIG. 5, control unit 36 in FIG. 9 checks whether the node information of the correct class is swept out into the external memory 31 in FIG. 9 before creating new output and intermediate nodes of the correct class in RAM 32 (FIG. 9). If the output node and intermediate node of the correct class do not exist in the external memory 31 in FIG. 9, control unit 36 creates a new output and intermediate node of the correct class. If not, control unit 36 in FIG. 9 retrieves the correct class node information from external memory 31 in FIG. 9.

While the present invention has been described with reference to preferred embodiments thereof, those skilled in the art will know of various changes in form and detail that may be made without departing from the intended scope of the present invention as defined in the appended claims.

I claim:
1. A neural network system for classifying an input pattern, comprising:
 a) means for comparing the input pattern to templates of already learned patterns, each template having a class associated with said template;
 b) means for selecting a class for the input pattern based on results of the comparison by the means for comparing;
 c) means for determining whether a correct class was selected by the means for selecting for the input pattern;
 d) means, operative in response to a determination that a correct class was selected for the input pattern, for determining whether the correct class has been stably classified by comparing a template of the selected class which is most similar to the input pattern to a template of another class which is most similar to the input pattern among templates of said another class to determine whether the compared templates are similar to a degree that classification may not be accurate; and
 e) means, operative in response to a determination that the correct class has not been stably classified, for adjusting the compared templates to ensure stable classification.

2. A neural network system as recited in claim 1 wherein the input pattern is audio data.

3. A neural network system as recited in claim 1 wherein the input pattern is visual data.

4. A neural network system as recited in claim 3 wherein the input pattern is character data.

5. A neural network system as recited in claim 1 wherein the templates are encoded as weights and an input pattern comprises one or more elements, a separate weight being provided for comparison with each element of the input pattern.

6. A neural network system as recited in claim 1 wherein the means for selecting a class selects the class of the template most similar to the input pattern.

7. A neural network system as recited in claim 1 wherein the means for determining whether a correct class was selected is provided with the correct class by the user and compares the correct class with the selected class to determine whether the selection was correct.

8. The neural network of claim 1, wherein
 the means for comparing the input pattern to templates provides an output value for each template, and
 the means for determining whether the correct class has been stably classified includes means for determining whether the output value Oj for the template of the correct class and the output value Oi for the template of the other class satisfy the following condition:

$$Oi - Oj \leq th2$$

wherein th2 is a predetermined threshold constant.

9. The neural network of claim 8,
 wherein each template is represented by weighting factors $Wi1, Wi2, \ldots, WiN$, and an input pattern is represented by factors $S1, S2, \ldots, SN$, and
 wherein the means for adjusting the compared templates modifies the weighting factors $Wj1, Wj2, \ldots, WjN$ of the template of the correct class according to the following expression:

$$Wjk = Wjk + \alpha[Sk - Wjk] \text{ for } k=1, \ldots N$$

and the weighting factors $Wi1, Wi2 \ldots, WiN$ of the template of the other class according to the following expression:

$$Wik=Wik-\alpha[Sk-Wik] \text{ for } k=1, \ldots N$$

wherein $\alpha$ is a positive constant.

10. The neural network of claim 1, further comprising:
first means, operative in response to a determination that the correct class was not selected for the input pattern, for determining whether a template of the correct class which is most similar to the input pattern is sufficiently close to the input pattern to permit correct classification; and means, operative in response to a determination that the template of the correct class is not sufficiently close to the input pattern, for creating a new template of the correct class based on the input pattern.

11. The neural network of claim 10, wherein
the means for comparing the input pattern to templates provides an output value for each template, and
the first means for determining includes means for determining whether the output value $Oj$ for the template of the correct class satisfies the following condition:

$$Oj \geq th1$$

wherein $th1$ is a predetermined threshold value.

12. The neural network of claim 10, wherein
the means for comparing the input pattern to templates provides an output value for each template, and
the first means for determining means for determining whether the output value $Oj$ for the template of the correct class and the output value $Oi$ for the template of the selected class which is most similar to the input pattern satisfy the following conditions:

$$Oj<th1 \text{ and } Oj-Oi>th2,$$

where $th1$ is a first predetermined threshold constant and $th2$ is a second predetermined threshold constant.

13. The neural network of claim 12,
wherein each template is represented by weighting factors $Wi1, Wi2, \ldots, WiN$, and an input pattern is represented by factors $S1, S2 \ldots, SN$, and
further comprising means, responsive to a determination that output values $Oj$ and $Oi$ do not satisfy said conditions, for modifying the weighting factors $Wj1, Wj2, \ldots, WjN$ of the template of the correct class according to the following expression:

$$\text{Weight of } Uj: Wjk=Wjk+\alpha[Sk-Wjk] \text{ for } k=1, \ldots N$$

wherein $\alpha$ is a constant.

14. The neural network of claim 10, further comprising:
means, operative in response to a determination that the correct class was not selected for the input pattern and to a determination that a template of the correct class does exist, for determining a reason for incorrect classification; and
means, operative in response to a failure to determine the reason for incorrect classification, for adjusting the template of only the correct class which is most similar to the input pattern.

15. The neural network of claim 1, further comprising:
first means, operative in response to a determination that the correct class was not selected for the input pattern, for determining whether the correct class is stably classified by comparing a template of the correct class which is most similar to the input pattern among templates of the correct class to a template of the selected class which is most similar to the input pattern among templates of the selected class.

16. The neural network of claim 15, wherein
the means for comparing the input pattern to templates provides an output value for each template, and
the first means for determining whether the correct class was stably classified includes means for determining whether the output value $Oj$ for the template of the correct class and the output value $Oi$ for the template of the selected class satisfy the following conditions:

$$Oj<th1 \text{ and } Oj-Oi>th2,$$

where $th1$ is a first predetermined threshold constant and $th2$ is a second predetermined threshold constant.

17. The neural network of claim 16,
wherein each template is represented by weighting factors $Wi1, Wi2 \ldots, WiN$, and an input pattern is represented by factors $S1, S2 \ldots, SN$, and
further comprising means, responsive to a determination that output values $Oj$ and $Oi$ do not satisfy said exchange conditions, for modifying the weighting factors $Wj1, Wj2, \ldots, WjN$ of the template of the correct class which is most similar to the input pattern according to the following expression:

$$\text{Weight of } Uj: Wjk=Wjk+\alpha[Sk-Wjk] \text{ for } k=1, \ldots N$$

wherein $\alpha$ is a positive constant.

18. The neural network of claim 1, further comprising:
means, responsive to a signal indicative of the correct class and of classes of the template to of already learned patterns, for determining whether a template of the correct class exists; and
means, operative in response to a determination that no template of the correct class exists, for creating a new template based on the input pattern for a new class to be used by the means for comparing.

19. The neural network of claim 18, further comprising:
first means, operative in response to a determination that the correct class was not selected for the input pattern, for determining whether a template of the correct class which is most similar to the input pattern is sufficiently close to the input pattern to permit correct classification; and
means, operative in response to a determination that the template of the correct class is not sufficiently close to the input pattern, for creating a new template of the correct class based on the input pattern.

20. The neural network of claim 19, further comprising:
means, operative in response to a determination that the correct class was not selected for the input pattern and to a determination that the correct class has a template sufficient to permit correct classification, for determining a reason for incorrect classification; and
means, operative in response to a failure to determine the reason for incorrect classification, for adjusting the template of only the correct class which is most similar to the input pattern.

21. The neural network of claim 18, further comprising:
means, operative in response to a determination that a template of the correct class exists, for determining a reason for incorrect classification; and
means, operative in response to a failure to determine the reason for incorrect classification, for adjusting the template of only the correct class which is most similar to the input pattern.

22. The neural network of claim 1, further comprising:

means, operative in response to a determination that the correct class was not selected for the input pattern, for determining a reason for incorrect classification;

means, operative in response to a determination of the reason for incorrect classification, for adjusting templates according to the determined reason to improve a likelihood of correct classification; and means, operative in response to a failure to determine the reason for incorrect classification, for adjusting the template of only the correct class which is most similar to the input pattern.

23. A neural network system for classifying an input pattern, comprising:
   a) means for comparing the input pattern to templates of already learned patterns, each template having a class associated with said template;
   b) means for selecting a class for the input pattern based on results of the comparison by the means for comparing;
   c) means for determining whether a correct class is selected for the input pattern;
   d) means, responsive to a signal indicative of the correct class and of classes of the templates of already learned patterns, for determining whether a template of a correct class exists; and
   e) means, operative in response to a determination that the correct class was not selected for the input pattern and a determination that a template of the correct class does not exist, for creating a new template based on the input pattern for a new class to be used by the means for comparing.

24. A neural network system as recited in claim 23 further comprising:

means, operative in response to a determination that the correct class was not selected for the input pattern, for determining whether the correct class has a template sufficiently close to the input pattern to permit correct classification; and means, operative in response to a determination that the correct class does not have a template sufficiently close to the input pattern to permit correct classification, for creating a new template of the correct class that is identical to the input pattern.

25. A neural network system as recited in claim 24 further comprising:

means, operative in response to a determination that the correct class has a template sufficient to enable correct classification, for determining whether the correct class has been stably classified by comparing a template of the selected class which is most similar to the input pattern to a template of the correct class which is most similar to the input pattern among templates of the correct class to determine whether the compared templates are similar to a degree that classification may not be stable; and means, operative in response to a determination that the correct class has not been stably classified, for adjusting the template of the selected class from the template of the correct class to facilitate proper classification.

26. The neural network of claim 24, further comprising:

means, operative in response to a determination that the correct class was not selected for the input pattern and a determination that the correct class has a template sufficient to permit correct classification, for determining a reason for incorrect classification; and means, operative in response to a failure to determine the reason for incorrect classification, for adjusting the template of only the correct class which is most similar to the input pattern.

27. A neural network system as recited in claim 23 further comprising;

means for adjusting the templates of already learned patterns to facilitate correct classification.

28. A neural network system as recited in claim 23 wherein the input pattern is audio data.

29. A neural network system as recited in claim 23 wherein the input pattern is visual data.

30. A neural network system as recited in claim 29 wherein the input pattern is character data.

31. A neural network system as recited in claim 23 wherein the templates are encoded as weights and an input pattern comprises one or more elements, a separate weight being provided for comparison with each element of the input pattern.

32. A neural network system as recited in claim 23 wherein the means for selecting a class selects the class of the template most similar to the input pattern.

33. A neural network system as recited in claim 23 wherein the means for determining whether a correct class was selected is provided with the correct class by the user and compares the correct class with the selected class to determine whether the selection was correct.

34. The neural network of claim 23, further comprising:

means, operative in response to a determination that a template of the correct class exists, for determining a reason for incorrect classification; and means, operative in response to a failure to determine the reason for incorrect classification, for adjusting the template of only the correct class which is most similar to the input pattern.

35. A neural network for classifying an input vector into a class comprising:
   a. an input buffer for storing the input vector;
   b. means for storing templates of already learned patterns of respective classes, each template holding a pattern associated with a particular class;
   c. means for comparing the input vector Which is stored in the input buffer with each of the templates which is stored in said means for storing templates and for generating an output signal for each comparison with a template, wherein said output signal indicates a difference between the input signal vector and the template;
   d. means for selecting for each class an output signal from output signals that are generated for a respective class, said means for selecting receiving all of the output signals from the means for comparing which indicate results of comparisons performed by the means for comparing with templates of the class and selecting the output signal having a smallest difference;
   e. means for receiving the selected output signals for each class, and for determining among the selected output signals which output signal has the lowest value, and for determining the class of said means for selecting that selected the lowest value output signal, and for generating an output indicative of the class of said means for selecting that sent the lowest value output signal;
   f. means for receiving a signal indicative of a correct class of the input vector; and g. means for learning for iteratively updating the template which is stored in the means for storing templates so that the neural network learns to correctly classify the input vector, said means for leaning including means for determining whether the output of the means for receiving the selected output signal indicated the correct class, and means, responsive to a determination that the correct class was selected for the input vector, for determining whether the correct class has been stably classified by comparing a template of the correct class which is most similar to the input vector to a template of another class which is most similar to the input vector among templates of said another class, to determine whether the compared templates are similar to a degree that classification may not be accurate, responsive to a determination that the correct class has not been stably classified, for adjusting the compared templates.

36. A neural network as recited in claim 35 wherein said means for learning creates new templates.

37. A neural network as recited in claim 35 wherein said means for learning creates new templates having new classes.

38. A neural network as recited in claim 35 wherein the input vector is audio data.

39. A neural network as recited in claim 35 wherein the input vector is visual data.

40. In a neural network, a method of classifying an input pattern of physical data, comprising the steps of:

a. comparing the input pattern of physical data with templates of patterns for each class of input to yield a value indicative of the difference between the template and the input pattern;

b. selecting a minimum value yielded by the comparisons with templates of patterns of each class as a class minimum value for the class;

c. selecting a smallest value among the class minimum values;

d. classifying an input signal as having a class identical to the class of a template that yielded the smallest value among the class minimum values;

e. determining whether the input signal was correctly classified; and f. comparing the template that yielded the smallest value among the class minimum values and adjusting the compared templates when the compared templates are similar to a degree that classification may not be accurate.

41. The method of claim 40, further comprising the steps of:

determining whether a template of a correct class exists; and creating a new template based on the input pattern for a new class when a template of the correct class does not exist.

42. The method of claim 41, further comprising the steps of:

determining whether a template of the correct class which is most similar to the input pattern is sufficiently close to the input pattern to permit correct classification; and creating a new template of the correct class based on the input pattern when a template sufficient to permit correct classification is not available.

43. The method of claim 42, further comprising the steps of:

determining a reason for any incorrect classification; and adjusting the template of only the correct class which is most similar to the input pattern when a reason for any incorrect classification cannot be determined.

44. The method of claim 41, further comprising the steps of:

determining a reason for incorrect classification; and adjusting the template of only the correct class which is most similar to the input pattern when a reason for any incorrect classification cannot be determined.

45. The method of claim 40, further comprising the steps of:

determining whether a template of the correct class which is most similar to the input pattern is sufficiently close to the input pattern to permit correct classification; and creating a new template of the correct class based on the input pattern when a template sufficient to permit correct classification is not available.

46. The method of claim 45, further comprising the steps of:

determining a reason for incorrect classification; and adjusting the template of only the correct class which is most similar to the input pattern when no reason for incorrect classification can be determined.

47. The method of claim 40, further comprising the steps of:

determining a reason for any incorrect classification;

adjusting templates according to any determined reason to improve a likelihood of correct classification; and adjusting the template of only the correct class which is most similar to the input pattern when no reason for incorrect classification can be determined.

48. The method of claim 40, further including the step of scanning an object with a video camera to obtain said input pattern of physical data.

49. The method of claim 40, wherein the physical data is audio data.

50. The method of claim 40, wherein the physical data is video data.

51. A neural network system for classifying an input pattern, comprising:

a) means for comparing the input pattern to templates of already learned patterns, each template having a class associated with said template;

b) means for selecting a class for the input pattern based on results of the comparison by the means for comparing;

c) means for determining whether a correct class was selected by the means for selecting for the input pattern;

d) means, operative in response to a determination that the correct class was selected for the input pattern, for determining whether the correct class has been stably classified;

e) means, operative in response to a determination that the correct class has not been stably classified, for adjusting templates of already learned pattern so as to ensure stable classification;

f) means, operative in response to a determination that the correct class was not selected for the input pattern, for determining a reason for incorrect classification;

g) means, operative in response to a determination of the reason for incorrect classification, for adjusting templates according to the determined reason to improve a likelihood of correct classification; and h) means, operative in response to a failure to determine the reason for incorrect classification, for adjusting the template of only the correct class which is most similar to the input pattern.

52. The neural network system of claim 51, wherein the means for determining the reason for incorrect classification includes:

means for determining whether a template of a correct class exists;

means for determining whether the correct class has a template sufficiently close to the input pattern to enable correct classification; and means for determining whether the template of the correct class is sufficiently close to the template most similar to the input pattern of the selected class so that classification may not be stable.

53. The neural network of claim 51, wherein the means for adjusting templates, operative in response to a determination of the reason for incorrect classification, includes means, operative in response to a determination that a template of the correct class does not exist, for creating a new template for a new class corresponding to the correct class.

54. A neural network system for classifying an input pattern, comprising:

a) means for comparing the input pattern to templates of already learned patterns, each template having a class associated with said template;

b) means for selecting a class for the input pattern based on results of the comparison by the means for comparing;

c) means for determining whether a correct class is selected for the input pattern;

d) means, operative in response to a determination that the correct class was not selected for the input pattern, for determining whether the correct class has a template sufficiently close to the input pattern to permit correct classification; and e) means, operative in response to a determination that the correct class does not have a template sufficiently close to the input pattern to permit correct classification, for creating a new template for the correct class based on the input pattern.

55. The neural network of claim 54, further comprising:

means, operative in response to a determination that the correct class does not have a template sufficiently close to the input pattern to permit correct classification, for determining a reason for incorrect classification; and means, operative in response to a failure to determine the reason for correct classification, for adjusting the template of the correct class which is most similar to the input pattern.

56. A neural network system for classifying an input pattern, comprising:

a) means for comparing the input pattern to templates of already learned patterns, each template having a class associated with said template;

b) means for selecting a class for the input pattern based on results of the comparison by the means for comparing;

c) means for determining whether a correct class was selected by the means for selecting for the input pattern;

d) means, operative in response to a determination that the correct class was selected for the input pattern, for determining whether the correct class has been stably classified by comparing a template of the selected class which is most similar to the input pattern to a template of another class which is most similar among templates of said another class to the input pattern to determine whether the templates are similar to a degree that classification may not be accurate; and e) means, operative in response to a determination that the correct class was not selected for the input pattern, for determining whether the correct class has been stably classified by comparing a template of the selected class which is most similar to the input pattern to a template of the correct class which is most similar to the input pattern among templates of the correct class to determine whether the templates are similar to a degree that classification may not be accurate; and f) means, operative in response to a determination that the correct class has not been stably classified, for adjusting the compared templates so as to ensure stable classification.

57. In a neural network, a method of classifying an input pattern of physical data, comprising the steps of:

a. comparing the input pattern of physical data with templates of patterns for each class of input to yield a value indicative of the difference between the template and the input pattern;

b. selecting a minimum value yielded by the comparisons with templates of each class as a class minimum value for the class;

c. selecting a smallest value among the class minimum values;

d. classifying an input signal as having a class identical to the class of a template that yielded the smallest value among the class minimum values;

e. determining whether the input signal was correctly classified;

f. determining whether a template of a correct class exists; and g. creating a new template based on the input pattern for a new class to be used in the step of comparing when a template of the correct class does not exist and the input pattern is incorrectly classified.

58. The method of claim 57 further comprising the steps of:

determining whether the correct class has a template sufficiently close to the input pattern to permit correct classification; and creating a new template of the correct class that is identical to the input pattern when there is not a template sufficient to permit correct classification.

59. The method of claim 58, further comprising the steps of:

determining a reason for any incorrect classification; and adjusting the template of only the correct class which is most similar to the input pattern when a reason for incorrect classification is not determined.

60. The method of claim 57, further comprising the steps of:

determining a reason for any incorrect classification; and when reason for incorrect classification cannot be determined, adjusting the template of only the correct class which is most similar to the input pattern.

61. In a neural network, a method of classifying an input pattern of physical data, comprising the steps of:

a. comparing the input pattern of physical data with templates of patterns for each class of input to yield a value indicative of the difference between the template and the input pattern;
b. selecting a minimum value yielded by the comparisons with templates of each class as a class minimum value for the class;
c. selecting a smallest value among the class minimum values;
d. classifying an input signal as having a class identical to the class of a template that yielded the smallest value among the class minimum values;
e. determining whether the input signal was correctly classified; and
f. determining whether the correct class has a template sufficiently close to the input pattern to permit correct classification; and
g. creating a new template for the correct class based on the input pattern when the correct class does not have a template sufficiently close to the input pattern to permit correct classification.

62. The method of claim 61, further comprising the steps of:

determining a reason for any incorrect classification; and adjusting the template of the correct class which is most similar to the input pattern when a reason for incorrect classification cannot be determined.

63. In a neural network, a method of classifying an input pattern of physical data, comprising the steps of:

a. comparing the input pattern of physical data with templates of patterns for each class of input to yield a value indicative of the difference between the template and the input pattern;
b. selecting a minimum value yielded by the comparisons with templates of each class as a class minimum value for the class;
c. selecting a smallest value among the class minimum values;
d. classifying an input signal as having a class identical to the class of a template that yielded the smallest value among the class minimum values;
e. determining whether the input signal was correctly classified; and
f. determining whether the correct class has been stably classified;
g. adjusting templates of already learned patterns so as to ensure stable classification when the correct class has not been stably classified;
h. determining a reason for any incorrect classification;
i. adjusting templates according to any determined reason for incorrect classification to improve a likelihood of correct classification; and
j. adjusting the template of only the correct class which is most similar to the input pattern when no reason can be determined for any incorrect classification.

* * * * *

UNITED STATES PATENT AND TRADEMARK OFFICE
CERTIFICATE OF CORRECTION

PATENT NO. : 5,682,503
DATED : October 28, 1997
INVENTOR(S) : Fumio Yoda

It is certified that error appears in the above-identified patent and that said Letters Patent is hereby corrected as shown below:

Column 2, line 40, please change "Wj" to -- Wij --.
Column 22, line 45, change "Which" to -- which --.

Signed and Sealed this

Fifteenth Day of September, 1998

Attest:

BRUCE LEHMAN

Attesting Officer

Commissioner of Patents and Trademarks